US011822006B2

(12) United States Patent
Wintermantel

(10) Patent No.: US 11,822,006 B2
(45) Date of Patent: Nov. 21, 2023

(54) RADAR SYSTEM WITH MONITORING OF THE FREQUENCY MODULATION OF A SEQUENCE OF SIMILAR TRANSMISSION SIGNALS

(71) Applicant: Conti Temic microelectronic GmbH, Nuremberg (DE)

(72) Inventor: Markus Wintermantel, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/674,650

(22) Filed: Nov. 5, 2019

(65) Prior Publication Data
US 2022/0244349 A1 Aug. 4, 2022

Related U.S. Application Data

(63) Continuation of application No. PCT/DE2018/020036, filed on Apr. 9, 2018.

(30) Foreign Application Priority Data

May 5, 2017 (DE) .................... 10 2017 207 604.6

(51) Int. Cl.
*G01S 7/40* (2006.01)
*G01S 7/35* (2006.01)
*G01S 13/931* (2020.01)

(52) U.S. Cl.
CPC ............. *G01S 7/40* (2013.01); *G01S 7/354* (2013.01); *G01S 7/4008* (2013.01); *G01S 13/931* (2013.01)

(58) Field of Classification Search
CPC ...... G01S 13/931; G01S 13/343; G01S 13/48; G01S 7/023; G01S 7/356; G01S 7/354;
(Continued)

(56) References Cited

U.S. PATENT DOCUMENTS 2,930,892 A * 3/1960 Palmer ............... H03D 3/10
455/337
3,113,308 A * 12/1963 Stavis ............... G01S 13/60
342/75
(Continued)

FOREIGN PATENT DOCUMENTS

CN 87104232 A 12/1988
CN 1942781 A 4/2007
(Continued)

OTHER PUBLICATIONS

Mueller, Felix, et al., A Method for the Analysis of Ramp-Inherent Linearity Distortions in Automotive Radar—Applications, GeMiC, 2015, pp. 217-220,ISBN/ISSN: 9783981266863, Ratingen, Germany.
(Continued)

*Primary Examiner* — Vladimir Magloire
*Assistant Examiner* — Michael W Justice

(57) ABSTRACT

A method for detecting the environment of a motor vehicle utilizing a radar sensor includes bringing about frequency modulation with a controllable oscillator and generating a sequence of transmission-frequency-modulated transmit signals, which each have the same nominal frequency profile. Received signals reflected from objects are evaluated such that an actual profile of the transmission frequency within the transmit signals or a deviation of the actual profile from the nominal frequency profile is established. Depending on an actual profile and/or a deviation determined, correction in the driving of the oscillator and/or correction in the evaluation of the received signals and/or adaptation of the driver assistance function and/or the autonomous driving maneuver function up to and including disabling thereof are performed.

11 Claims, 16 Drawing Sheets

(58) Field of Classification Search
CPC .......... G01S 7/288; G01S 7/40; G01S 7/4008;
G01S 7/4021; G01S 2013/9321; G01S
2013/0245
USPC ............ 342/173, 70, 128, 71, 192, 200, 100
See application file for complete search history.

(56) References Cited

U.S. PATENT DOCUMENTS

| | | | | |
|---|---|---|---|---|
| 4,626,856 | A * | 12/1986 | Pierson | G01S 7/288 342/174 |
| 4,817,197 | A * | 3/1989 | Shimizu | H03J 7/065 455/208 |
| 6,016,080 | A * | 1/2000 | Zuta | H03L 7/199 331/25 |
| 6,825,797 | B2 * | 11/2004 | Ishii | G01S 7/4008 342/107 |
| 6,952,570 | B2 * | 10/2005 | Nagayasu | H04L 27/0014 455/208 |
| 7,298,772 | B1 * | 11/2007 | Neerudu | H04L 27/2662 375/136 |
| 7,457,347 | B2 * | 11/2008 | Pietraski | H04L 25/03248 375/150 |
| 7,773,665 | B2 * | 8/2010 | Eum | H04B 7/15528 375/376 |
| 7,898,344 | B2 * | 3/2011 | Hongo | G01S 7/0235 342/464 |
| 7,912,120 | B2 * | 3/2011 | Pietraski | H04B 1/7097 375/232 |
| 8,004,327 | B2 * | 8/2011 | Hongo | H03L 7/093 327/147 |
| 8,111,788 | B2 * | 2/2012 | Pietraski | H04L 25/03248 375/232 |
| 8,390,507 | B2 * | 3/2013 | Wintermantel | G01S 7/0233 342/70 |
| 8,436,763 | B2 * | 5/2013 | Wintermantel | G01S 7/0233 342/70 |
| 8,538,346 | B2 * | 9/2013 | Arai | H04L 27/0014 375/232 |
| 9,264,059 | B2 * | 2/2016 | Tousi | H03M 1/183 |
| 2002/0014989 | A1 | 2/2002 | Winter et al. | |
| 2004/0125894 | A1 * | 7/2004 | Nakamura | H04L 27/227 375/326 |
| 2006/0098716 | A1 * | 5/2006 | Pietraski | H04L 25/03248 375/E1.032 |
| 2007/0040728 | A1 | 2/2007 | Nishimura et al. | |
| 2008/0061891 | A1 * | 3/2008 | Hongo | G01S 7/35 327/156 |
| 2009/0033538 | A1 | 2/2009 | Winkler | |
| 2009/0060020 | A1 * | 3/2009 | Pietraski | H04B 1/7097 375/232 |
| 2009/0129450 | A1 * | 5/2009 | Eum | H04H 20/02 375/214 |
| 2010/0213993 | A1 * | 8/2010 | Hongo | H03L 7/087 327/156 |
| 2010/0261434 | A1 * | 10/2010 | Arai | H04L 27/2272 455/73 |
| 2010/0316109 | A1 * | 12/2010 | Pietraski | H04B 1/7097 375/232 |
| 2011/0074620 | A1 * | 3/2011 | Wintermantel | G01S 7/0233 342/70 |
| 2011/0080314 | A1 * | 4/2011 | Wintermantel | H01Q 9/0407 342/147 |
| 2011/0170589 | A1 * | 7/2011 | Pietraski | H04B 1/7097 375/232 |
| 2012/0001791 | A1 | 1/2012 | Wintermantel | |
| 2014/0270029 | A1 * | 9/2014 | Park | H04L 27/2671 375/362 |
| 2015/0326240 | A1 * | 11/2015 | Tousi | H03M 1/46 341/118 |
| 2016/0124075 | A1 | 5/2016 | Vogt et al. | |
| 2017/0115384 | A1 | 4/2017 | Loesch et al. | |
| 2017/0153316 | A1 | 6/2017 | Wintermantel | |
| 2018/0031688 | A1 | 2/2018 | Hesse | |
| 2018/0267159 | A1 | 9/2018 | Hieda | |
| 2019/0286127 | A1 * | 9/2019 | Watanabe | B62D 6/008 |
| 2019/0353769 | A9 | 11/2019 | Schoor et al. | |

FOREIGN PATENT DOCUMENTS

| | | | |
|---|---|---|---|
| CN | 105103003 A | 11/2015 | |
| CN | 105264400 A | 1/2016 | |
| CN | 106461759 A | 2/2017 | |
| DE | 0963561 B1 * | 2/1998 | ............... G01S 7/40 |
| DE | 10018553 A1 | 10/2001 | |
| DE | 102008009596 A1 | 8/2009 | |
| DE | 102009016480 A1 | 10/2010 | |
| DE | 102014214498 A1 | 1/2016 | |
| DE | 102015103149 A1 * | 9/2016 | ........... G01S 13/343 |
| DE | 102015103149 A1 | 9/2016 | |
| DE | 102016214808 A1 | 5/2017 | |
| EP | 0499952 A1 | 8/1992 | |
| JP | H10213651 A | 8/1998 | |
| JP | 2008298736 A | 12/2008 | |
| JP | 2012522972 A | 9/2012 | |
| JP | 2014062824 A | 4/2014 | |
| JP | 6066015 B1 | 1/2017 | |
| WO | 2009028010 A1 | 3/2009 | |
| WO | 2015185058 A1 | 12/2015 | |
| WO | 2015188987 A1 | 12/2015 | |
| WO | 2016139306 A1 | 9/2016 | |
| WO | 2017056287 A1 | 4/2017 | |

OTHER PUBLICATIONS

International Search Report and Written Opinion dated Jul. 12, 2018 from corresponding International Patent Application No. PCT/DE2018/200036.

German Search Report dated Feb. 23, 2018 for corresponding German Patent Application No. 10 2017 207 604.6.

Japanese Office Action dated Jan. 27, 2022, for the counterpart Japanese Application No. 2019-545950.

Chinese Office Action dated Feb. 28, 2023 for the Chinese counterpart Patent Application No. 201880033521.3.

Chinese Second Office Action dated Jul. 19, 2023, in counterpart Chinese Patent Application No. 201880033521.3 and DeepL translation of same.

* cited by examiner

RADAR SYSTEM WITH MONITORING OF
THE FREQUENCY MODULATION OF A
SEQUENCE OF SIMILAR TRANSMISSION
SIGNALS

CROSS REFERENCE TO RELATED APPLICATIONS

This application is a continuation of International application No. PCT/DE2018/200036, filed Apr. 9, 2018, which claims priority to German patent application No. 10 2017 207 604.6, filed May 5, 2017, each of which is hereby incorporated by reference.

TECHNICAL FIELD

The technical field relates generally to a radar system for use with driver assistance systems in motor vehicles, and more particularly to systems and methods for analyzing and monitoring the frequency modulation of the radar system over a sequence of similar transmit signals.

BACKGROUND

Motor vehicles are increasingly equipped with driver assistance systems which use sensor systems to detect the surroundings and derive automatic vehicle responses from the traffic situation identified in this way and/or notify the driver. A distinction is drawn between comfort and safety functions.

One important comfort function in ongoing development is Full Speed Range Adaptive ("FSRA") Cruise Control. The vehicle adjusts its velocity to the desired velocity specified by the driver, provided the traffic situation allows this, with the velocity otherwise being automatically adapted to the traffic situation.

A wide range of safety functions are now available. One group of functions reduce the braking or stopping distance in emergency situations; the spectrum of corresponding driver assistance functions extends from automatic brake prefill to reduce brake latency, through improved brake assist systems ("BAS+") to autonomous emergency braking. A further group comprises lane change functions: they warn the driver or intervene in steering if the driver wishes to make a dangerous lane change, i.e. if a vehicle is either located in the neighboring lane in the blind spot (BSD—"Blind Spot Detection") or is approaching rapidly from behind (LCA—"Lane Change Assist").

In the foreseeable future, the driver will however no longer merely be assisted, but rather the task of the driver will increasingly be performed autonomously by the vehicle itself, i.e., the driver will increasingly be replaced. This is known as autonomous driving.

For systems of the type described above, radar sensors are used, frequently also in conjunction with sensors from other technologies, such as, for example, camera sensors. Radar sensors have the advantage of operating reliably even under poor weather conditions and of being capable not only of measuring object distance but also directly the radial relative velocity thereof using the Doppler effect. Transmission frequencies of 24 GHz, 77 GHz and 79 GHz are commonly used.

As a result of the increasing functional scope and involvement of such systems, the requirements made of the sensors with regard to reliability are becoming ever greater. The radar image must correspond to reality, i.e., the object values, especially range, relative velocity and angle must be correct, no objects must be overlooked and no "ghost objects", which are not in reality there, should be reported.

A central element of radar sensors is modulation of the transmission frequency, so as to be able to measure range and relative velocity. The most common type of modulation is frequency modulation, in particular linear frequency modification, wherein a sequence of similar linearly modulated transmit signals is often used. An incorrect frequency modulation (e.g., through failure or malfunction of individual circuit parts) may result in the above-described errors, i.e., incorrectly measured object sizes, undetected objects, and ghost objects.

This could lead the driver assist function implemented with the radar system to function incorrectly. In the case of an emergency braking assist system, for example, unjustified emergency braking could be activated by ghost objects, which could lead to a rear-end collision by a following vehicle.

German patent document No. DE 10 2016 214 808 discloses an arrangement and a method for analyzing frequency modulation on the basis of a period counter, the values of which are accumulated over many individual, similar transmit signals, to which end the counter is reinitialized at each transmit signal, i.e., is not free-running. If the frequency modulation deviates too greatly from its nominal profile, either corrective measures are applied or the driver assistance system is partly or wholly disabled. With the approach proposed therein, it should be taken into account that counters are difficult or complex to implement at high frequency (in particular the time-accurate read-out) and have high power consumption (also caused by the then relatively high counter length). The frequency of the counter can be reduced by upstream frequency division or frequency mixing. Upstream division has the disadvantage, however, that the accuracy of the frequency analysis decreases as the division factor increases, while upstream mixing requires the generation of a further signal in the high frequency domain and thus significant effort.

As such, it is desirable to present a radar arrangement and method which may operate with large frequency division factors and/or do not require counter reinitialization. In addition, other desirable features and characteristics will become apparent from the subsequent summary and detailed description, and the appended claims, taken in conjunction with the accompanying drawings and this background.

SUMMARY

One advantage of the systems and methods describe herein result from the fact that monitoring of the frequency modulation of the radar system is made possible, so as, in the event of too great a deviation of the frequency modulation from the nominal profile thereof, either to apply corrective measures or to be able to partly or completely disable the driver assistance system in order to avoid malfunctioning of the driver assistance system.

In one exemplary embodiment, a method for a radar system for detecting the environment of a motor vehicle and performing a driver assistance function and/or autonomous driving maneuvers includes the following steps: bringing about frequency modulation by utilizing an open- or closed-loop-controllable oscillator, generating a sequence of $K_0$ ($K_0>1$) transmission-frequency-modulated transmit signals, which each have the same nominal frequency profile, optionally apart from a variation in frequency position, i.e., in particular a variation in the initial and thus synonymously the center frequency, emitting transmit signals by means of transmission means, receiving transmit signals reflected from objects by means of receiving means, analyzing the frequency profile of the transmit signals and evaluating the received signals, in particular for object detection, by means of signal processing means, wherein an actual profile of the transmission frequency within the transmit signals or a deviation of the actual profile from the nominal frequency profile is established absolutely or relatively, i.e. except for an indeterminate constant component, averaging over the $K_0$ transmit signals taking place for precise determination of in particular similar profiles or deviations, wherein, per transmit signal, one time-discrete signal is used for averaging which in each case contains information about the frequency profile of the transmit signal and which is preferably in each case generated by sampling of an analog signal or by reading out of a free-running counter at predetermined points in time, these time-discrete signals are unnormalized over the $K_0$ transmit signals with regard to the position of their phases and/or their initial values, and during an evaluation of these time-discrete signals normalization explicitly takes place or an influence of the position of their phase and/or their initial value is implicitly eliminated, and, depending on an actual profile determined in this way and/or a deviation determined in this way of the actual profile from the nominal profile of the frequency position and/or a quality measure derived therefrom, correction in the driving of the oscillator and/or correction in the evaluation of the received signals and/or adaptation of the driver assistance function and/or the autonomous driving maneuver function up to and including disabling thereof are performed.

Furthermore, in the method for a radar system a parameter of the frequency modulation of the individual transmit signals, in particular the frequency position and/or a parameter of the frequency profile of the oscillator, may be varied between the transmit signals, in order to ensure over the individual transmit signals a varying phase angle of the oscillator at the start of the transmit signal in order to prevent similar error effects during averaging.

In one embodiment of the method for a radar system, the averaging over the $K_0$ transmit signals takes place for precise determination of the actual profile of the transmission frequency or the deviation thereof from the nominal profile, in that a signal is used for analysis which is reduced in frequency relative to the transmit signal by frequency division by a factor of T>1 and/or by mixing, these low-frequency signals arising over the transmit signals are optionally sampled after filtering, these sampled signals arising over the transmit signals are at least approximately phase-normalized after further filtering, i.e. are phase-shifted to at least approximately the same phase angle, these phase-normalized signals are then added up and the actual frequency profile is determined from the phase profile of this accumulated and optionally previously also filtered signal.

In one advantageous configuration, in the method for a radar system the phase normalization may be effected, in the event of the low-frequency sampled signals being real-valued, in that the low-frequency sampled real-valued signals are in each case at least approximately converted into the analytical signal thereof, i.e. to the complex-valued signal with only the positive or negative frequency components, wherein preferably a first level Hilbert filter with the zero point at approximately the negative or positive of the center frequency of the frequency-modulated signals is preferably used for this purpose, a value is in each case determined in the same way from these analytical signals, for example the conjugate complexes of the first signal value or of the signal value at the point in time when the nominal frequency profile assumes the average frequency, and the analytical signals are multiplied in each case by this value.

In one embodiment, in the method for a radar system, the signal accumulated over the transmit signals or a signal derived therefrom may be converted by Hilbert filtering highly precisely into the analytical signal thereof.

In the method for a radar system, the frequency of the emitted transmit signals may be linearly modulated, the signals received by reflection of the transmit signals from objects may be transferred into the low-frequency domain by mixing with a signal whose frequency corresponds to the instantaneous transmission frequency or differs therefrom by a constant factor, the low-frequency receive signals are sampled $N_A$ times in an equidistant grid, and via these $N_A$ sampled values a first spectral analysis, in particular in the form of a discrete Fourier transform is formed, in order thereby in particular to be able to carry out a range measurement of the objects and a separation for simultaneous detection of a plurality of objects.

In one advantageous configuration, in the method for a radar system, the difference between an undelayed actual frequency profile and a measured actual frequency profile delayed by the time $\Delta t$ may be formed within the transmit signals, a signal is calculated, the frequency profile of which corresponds to this difference, a spectral analysis, in particular in the form of a discrete Fourier transform, is carried out via this signal, which spectral analysis results in a spectrum, and the resultant spectrum or its magnitude is used directly to derive a quality measure of the frequency modulation and/or a quality measure is derived from the deviation of the spectrum from the spectrum, expected in the case of a nominal frequency profile, of an object at the range r corresponding to the propagation time $\Delta t$, wherein the same window function is used for both spectral analyses and the resultant spectra are related to the same level for the purposes of the comparison.

In the method for a radar system, a spectral analysis, in particular in the form of a discrete Fourier transform, may be carried out by way of the difference between actual and nominal frequency profile and the resultant spectrum or the magnitude thereof used directly or after multiplication by a factor as a quality measure of the frequency modulation, wherein the factor may be proportional to an assumed object range or may contain a sine function, the argument of which is proportional to the object range and proportional to the respective frequency interpolation point of the spectral analysis.

In the method for a radar system, it may be derived from an established quality measure whether detection has or could have taken place by deviation of the actual frequency profile from the nominal frequency profile from another detected object, and this detection is then optionally wholly discarded or identified as potential apparent detection.

In one advantageous configuration, in the method for a radar system, the average frequency gradient of the actual frequency profile or the deviation thereof from the nominal frequency gradient may be determined and used for calculation of the range of objects.

In the method for a radar system the center frequency of the actual frequency profile or the deviation thereof from the nominal center frequency may be determined and used for calculation of the relative velocity and/or the angular position of objects.

In one exemplary embodiment, a radar system is set up to carry out a method according to a preceding preferred configuration.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
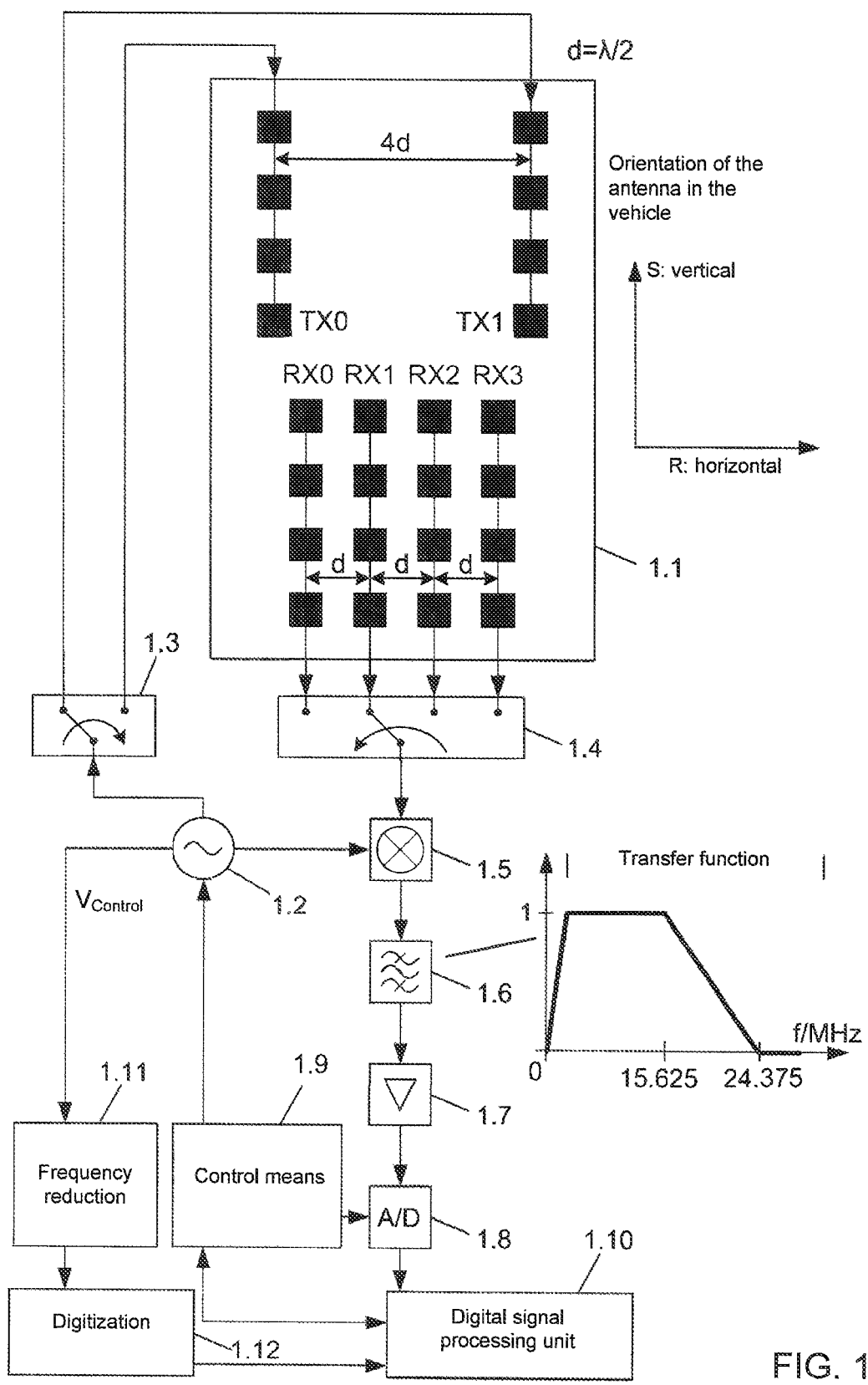
FIG. 1 shows an exemplary embodiment of a radar system.

The exemplary embodiment of a radar system depicted roughly in FIG. 1 is considered. The radar system has two transmit antennas TX0 and TX1 for emitting transmit signals and four receive antennas RX0-RX3 for receiving transmit signals reflected from objects; the antennas are fabricated as patch antennas on a flat printed circuit board 1.1 using planar technology, wherein this printed circuit board is oriented in the vehicle as depicted in the figure with regard to the horizontal and vertical directions. All antennas (transmit and receive antennas) in each case have the same radiation characteristics in elevation and azimuth. The 4 receive antennas (and thus their phase, i.e. emission, centers) each have the same lateral, i.e. horizontal distance d=λ/2=6.2 mm from one another, wherein λ=c/24.15 GHz=12.4 mm is the average wavelength of the emitted signals; the horizontal distance between the two transmit antennas is 4 times as great, i.e. 4d=2k.

In each case one of the two transmit antennas and one of the four receive antennas may be selected using the multiplexers 1.3, 1.4.

The transmit signals emitted on the respectively selected transmit antenna are derived from the high-frequency oscillator 1.2 in the 24 GHz domain, the frequency of which may be modified via a control voltage $v_{control}$. The control voltage is produced in the control means 1.9, wherein these control means for example contain a phase-locked loop or a digital/analog converter, which are driven such that the frequency profile of the oscillator corresponds at least approximately to the desired frequency modulation. To analyze the oscillator frequency, the latter is reduced in the circuit block 1.11 (by division and/or mixing) and the resultant signal is digitized in the circuit block 1.12—two different approaches to digitization are considered further below, on the one hand an analog/digital converter and on the other hand a counter; evaluation of this digital information about the oscillator frequency proceeds in the digital signal processing unit 1.10.

The signals received by the respectively selected receive antenna are likewise mixed down in the real-valued mixer 1.5 with the signal of the oscillator 1.2 into the low-frequency domain. Then the receive signals pass through a bandpass filter 1.6 with the depicted transfer function, an amplifier 1.7 and an analog/digital converter 1.8; they are then further processed in the digital signal processing unit 1.10.

Figure 2:
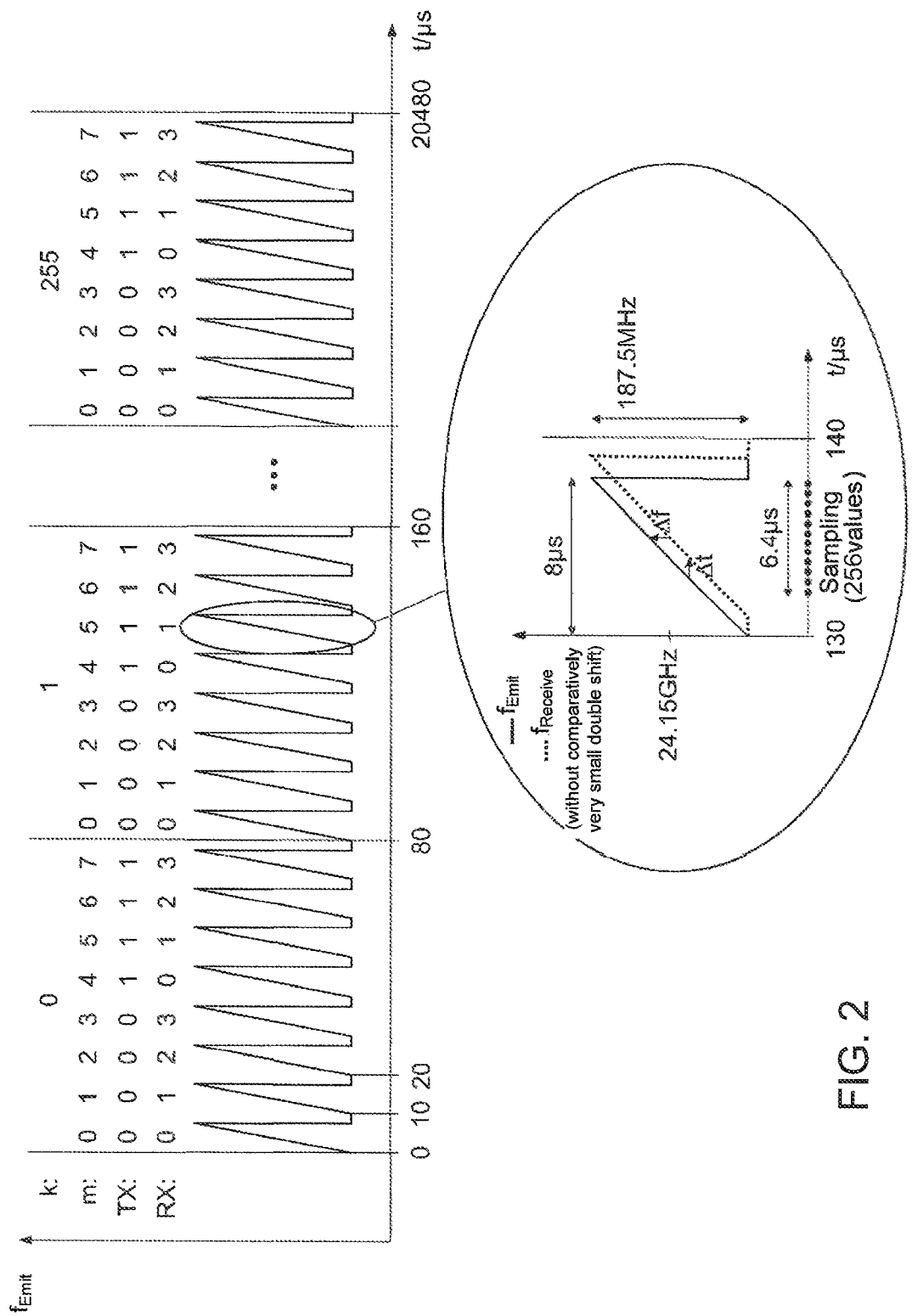
FIG. 2 shows the frequency of the transmit and receive signals, which include "frequency ramps", and the antenna combinations used in each case and including transmit and receive antennas, according to one exemplary embodiment.

To be able to measure the range of objects, the frequency of the high-frequency oscillator and thus of the transmit signals, as depicted in FIG. 2, is modified very rapidly in linear manner (by 187.5 MHz in 8 µs, wherein the center frequency amounts to 24.15 GHz); this is known as a frequency ramp. The frequency ramps are repeated periodically (every 10 µs); overall, there are 2048 frequency ramps, which all have the same nominal frequency profile. The 8 combinations of the 2 transmit and 4 receive antennas are periodically repeated over the frequency ramps in the sequence TX0/RX0, TX0/RX1, TX0/RX2, TX0/RX3, TX1/

RX0, TX1/RX1, TX1/RX2 and TX1/RX3, wherein prior to each frequency ramp the respective next combination is selected. In FIG. 2, k is the running variable over the 2048/8=256 frequency ramps for each antenna combination and m=4·$m_{TX}$+$m_{RX}$ is the running variable over the 8 antenna combinations TX$m_{TX}$/RX$m_{RX}$.

After mixing and thus also at the A/D converter for each frequency ramp and each of the 8 antenna combinations, the receive signal of an individual punctiform object is a sinusoidal oscillation; this may be explained as follows with reference to FIG. 2: if the object has the radial relative velocity zero relative to the radar system, the frequency difference Δf between transmitted signal and received signal is constant and at the same time proportional to the signal propagation time Δt and thus proportional to the radial range r=c·Δt/2, wherein c is the velocity of light and the factor 1/2 takes into consideration the fact that the propagation time Δt relates to the wave round trip; the frequency difference Δf leads, in the case of the above layout, to Δf=2r/c·187.5 MHz/8 μs=r·156.250 kHz/m. Since the received signal is mixed in real-valued manner with the oscillator and thus transmission frequency, a sinusoidal oscillation with the frequency Δf arises downstream of the mixer. This frequency lies in the MHz domain and is shifted again, in the case of a non-vanishing radial relative velocity, by the Doppler frequency, which however only lies in the kHz domain and is therefore approximately negligible relative to the frequency component resulting from the object range. If there is a plurality of objects, the receive signal is a superimposition of a plurality of sinusoidal oscillations of different frequencies.

During each frequency ramp, the receive signal at the A/D converter is sampled 256 times in each case with a spacing of 25 ns (i.e. every 40 MHz) (see FIG. 2), wherein the sampling always begins at the same point in time relative to the start of the ramp. As is apparent from FIG. 2, signal sampling only makes sense in the time domain in which receive signals from objects in the range domain of interest are received—after the ramp start, at least the propagation time corresponding to the range of maximum interest has thus to be awaited (in the case of a range of maximum interest of 99 m, this corresponds to 0.66 μs); it should be noted that here and hereinafter range is always understood to mean radial range.

Figure 3:
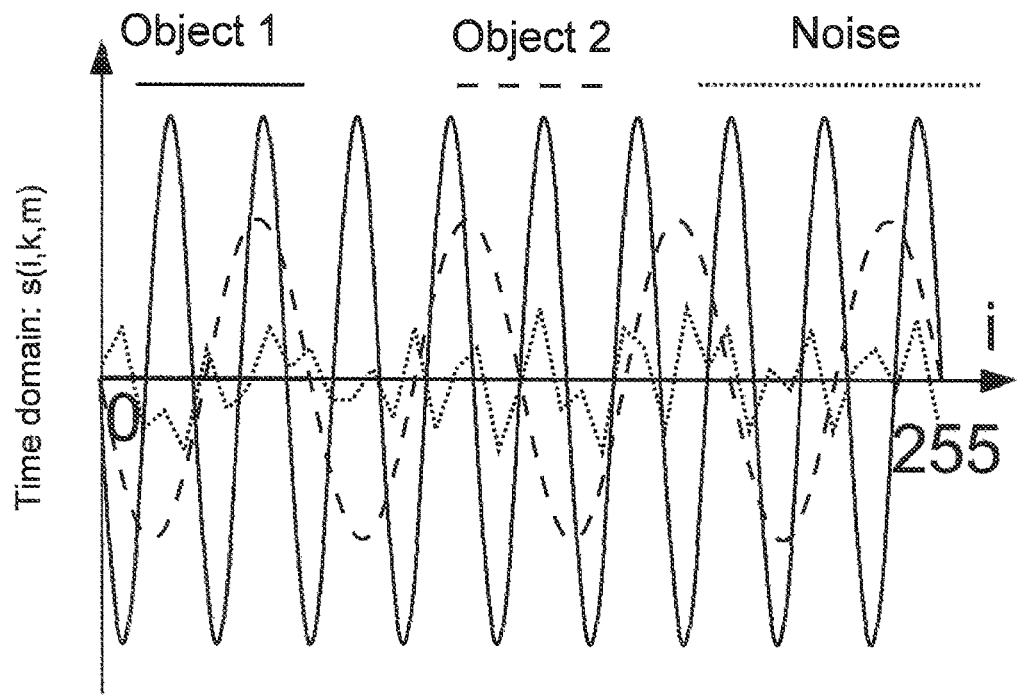
FIG. 3 shows a sampled signal in the presence of two objects prior to the first DFT (left) and after the first DFT (right), according to one exemplary embodiment.
Figure 3:
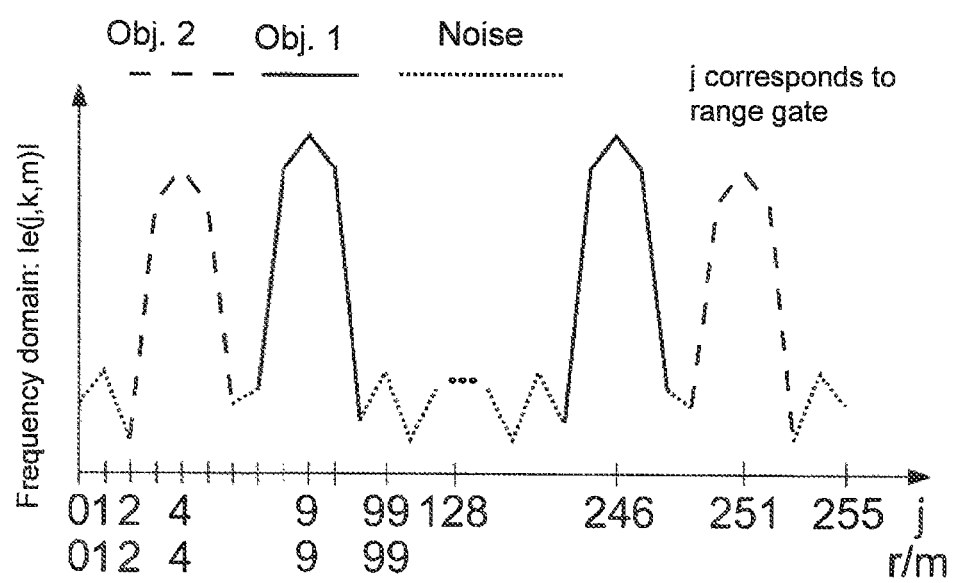

Then a discrete Fourier transform ("DFT") in the form of a fast Fourier transform ("FFT") is formed over the 256 sampled values of each frequency ramp. In this way, objects at different ranges, which lead to different frequencies, may be separated (see FIG. 3; left: signal s(i,k,m) prior to DFT in the presence of two objects, right: magnitude|e(j,k,m)| of result of DFT; here k is the running variable over the frequency ramps per antenna combination and m is the running variable over the 8 antenna combinations TX$m_{TX}$/RX$m_{RX}$). Each of the discrete frequency interpolation points j of the DFT corresponds to a range r and may therefore also be designated, in a manner similar to pulse radars, as a range gate; in the case of the above design, the range gates have precisely a range and thus a width Δr of one meter (results from Δr·156.250 kHz/m=1/(6.4 μs)). In the range gates in which objects are located, power peaks arise in the DFT. Since the sampled receive signals are real-valued (in which case there is no additional information in the upper half of the DFT, since symmetrical) and the upper transition domain of the bandpass filter 1.6 according to FIG. 1 has a frequency bandwidth of 8.75 MHz (corresponds to the domain of 56 frequency interpolation points), only 100 of the 256 discrete frequency interpolation points can be further processed (it should be noted that arbitrarily narrow filter transition domains cannot be achieved). The filter 1.6 damps small frequencies and thus the receive signals of near objects, in order to avoid overdrive of the amplifier 1.7 and of the A/D converter 1.8 (the signals received at the antennas are indeed stronger as the object distance decreases).

Figure 4:
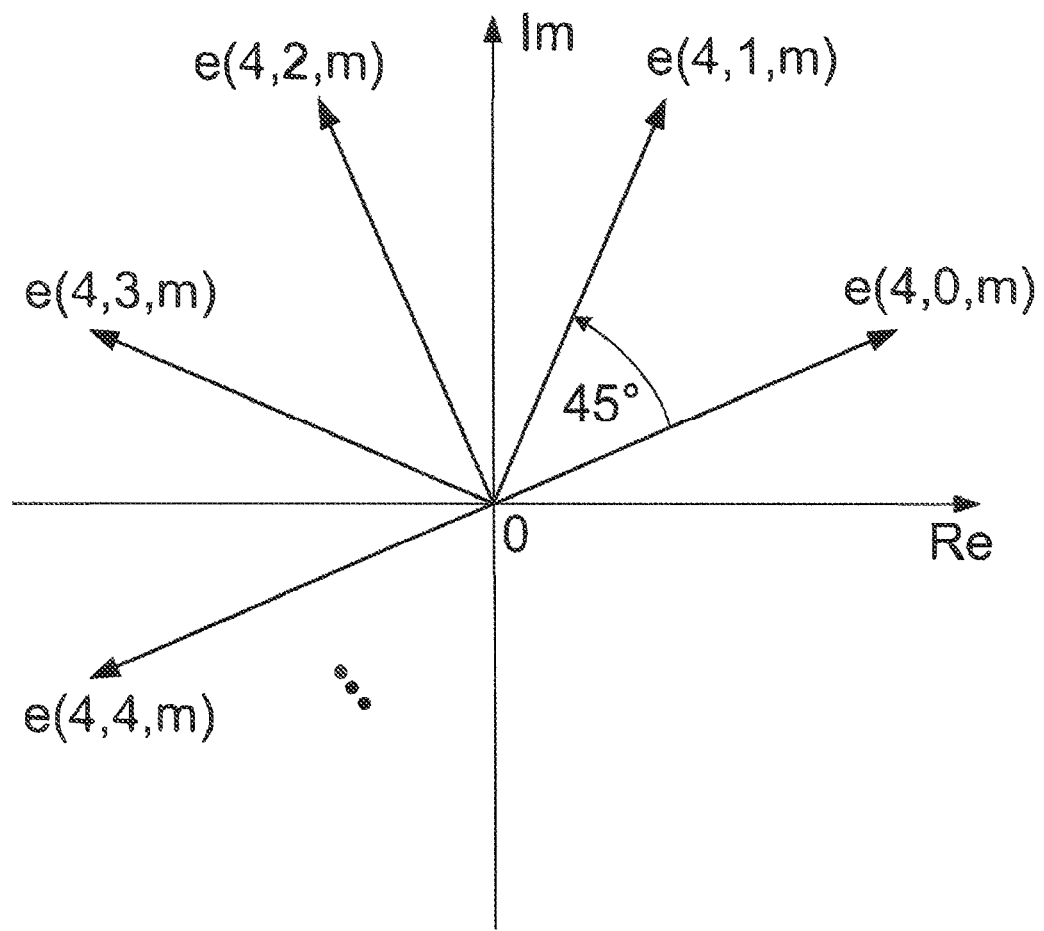
FIG. 4 shows the complex spectral value rotating over the frequency ramps in one range gate, in which exactly one object is present, according to one exemplary embodiment.

Over the 256 frequency ramps (k=0,1, . . . , 255) in each of the 8 antenna combinations m (m=0,1, . . . , 7) for each range gate j (i.e. each of the 100 frequency interpolation points considered) complex spectral values e(j,k,m) arise. If there is precisely one object at the range corresponding to a range gate, the complex spectral value rotates in this range gate j over the 256 frequency ramps of each of the 8 antenna combinations m=0,1, . . . , 7 with the Doppler frequency, since the range (in the mm domain or below) and thus the phase angle of the associated oscillation changes uniformly from frequency ramp to frequency ramp (see FIG. 4; the phase change depicted therein of 450 per frequency ramp corresponds to a reduction in the range of the object of λ/(8·2)=0.78 mm, wherein the wavelength is λ=c/24.15 GHz=12.4 mm and the factor 2 in the denominator takes into consideration the wave round trip, from which the radial relative velocity $v_{rel}$=0.78 mm/80 μs=35 km/h results; a positive sign of the radial relative velocity is defined as becoming more distant). A plurality of objects with different radial relative velocities in the same range gate are separated in that, for each antenna combination and each range gate over the complex spectral values arising in the 256 frequency ramps, a second DFT is calculated. Each discrete frequency interpolation point l of this second DFT corresponds to a set of Doppler frequencies (owing to the sampling of the Doppler frequency it can only be determined up to an unknown integral multiple of the sampling frequency thereof) and thus a set of radial relative velocities $v_{rel}$ of objects, such that the discrete frequency interpolation points of the second DFT may be denoted relative velocity gates; for the radial relative velocity the adjunct "radial" is hereinafter omitted for the sake of linguistic simplicity. The uniqueness domain of the relative velocity results from 2·$v_{rel,EB}$·80 μs=12.4 mm to yield $v_{rel,EB}$=280 km/h. The relative velocities $v_{rel}$=(1/256+p)·280 km/h are thus assigned to the relative velocity gate l, wherein p is integral.

The second DFT serves not only to determine the relative velocity, but also increases detection sensitivity through integration thereof—in the case of 256 frequency ramps by about 10·$\log_{10}$(256)=24 dB.

Figure 5:
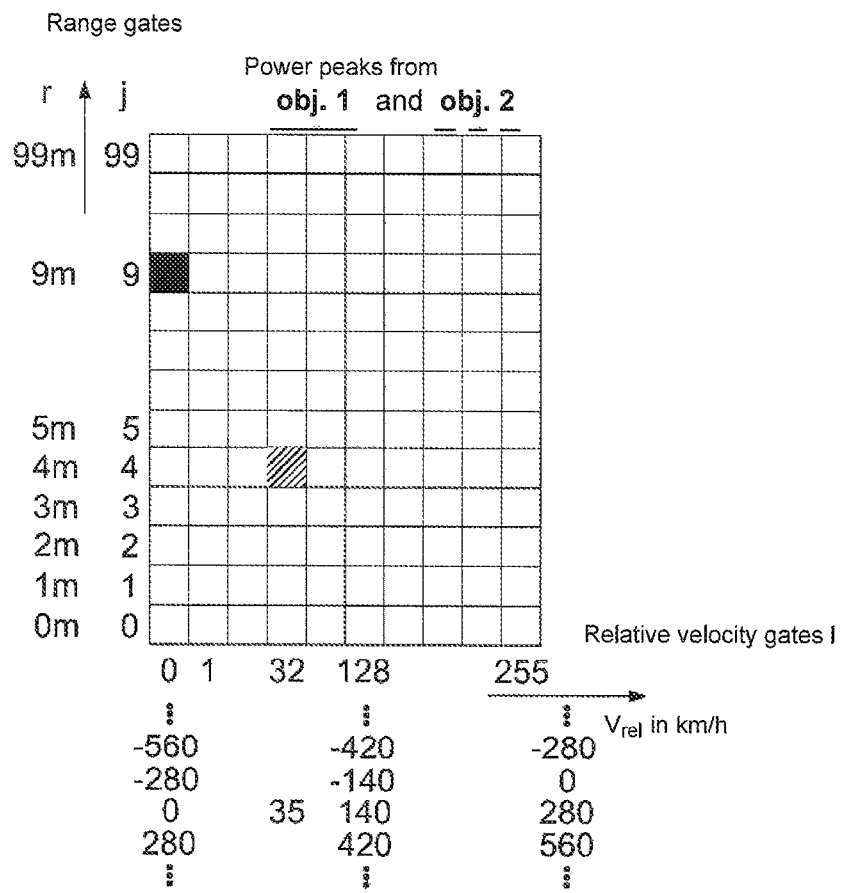
FIG. 5 is a schematic diagram of the two-dimensional complex-valued spectrum e(j,l,m) after the second DFT for an antenna combination m, according to one exemplary embodiment.

After this second DFT for the relative velocities, a two-dimensional complex-valued spectrum v(j,l,m) arises for each antenna combination m, wherein the individual cells may be denoted range/relative velocity gates and, as a result of objects, power peaks occur at the respectively associated range/relative velocity gate (see FIG. 5).

Figure 6:
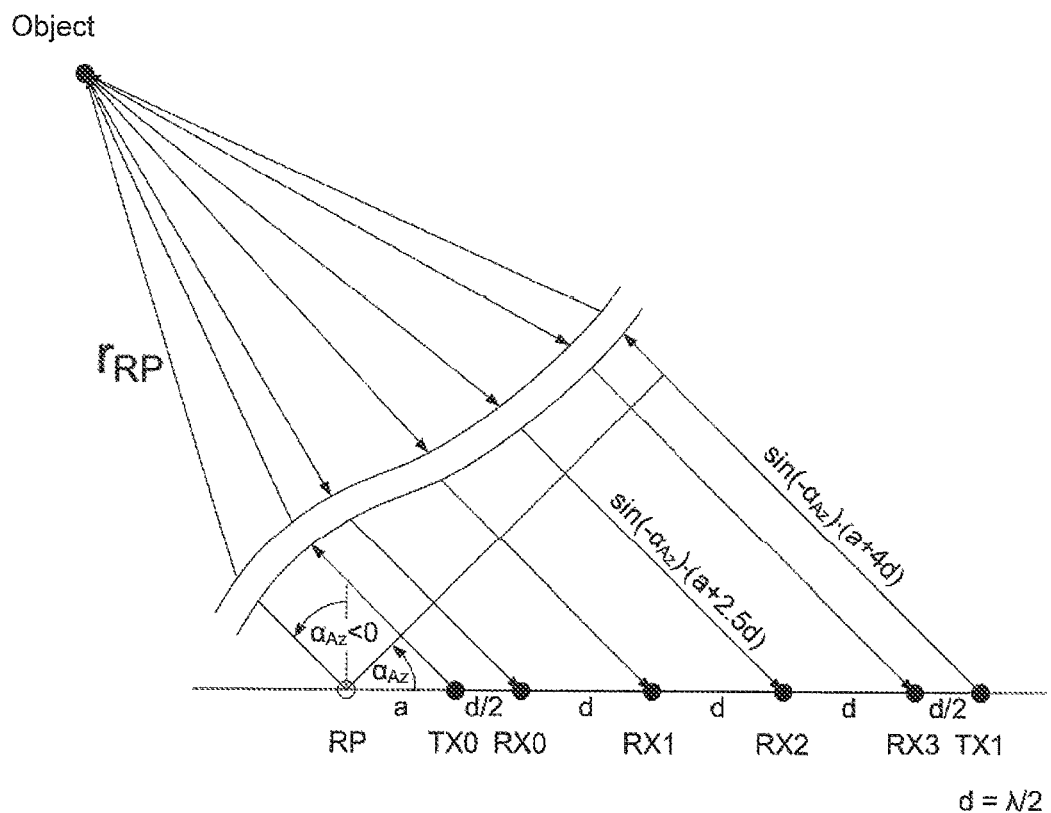
FIG. 6 shows the different path lengths between the individual antennas and a very remote object stationary relative to the sensor at an azimuth angle $\alpha_{Az}<0$, according to one exemplary embodiment.

Finally, the information from the 8 antenna combinations is then merged. The waves originating from the two transmit antennas and reflected from an individual punctiform object arrive at the 4 receive antennas with different phase angles relative to one another, depending on the azimuth angle $\alpha_{Az}$, since the ranges between object and transmit and receive antennas are slightly different. This is now explained in greater detail, wherein the object under consideration is initially intended to be stationary relative to the sensor, i.e. it has the relative velocity zero. FIG. 6 depicts in vertical projection the phase centers of the antennas and the beam paths to a very distant object stationary relative to the sensor with the azimuth angle $\alpha_{Az}$<0 (positive $\alpha_{Az}$ means to the right of the soldering surface to the board plane) and elevation angle $\alpha_{El}$=0 (in the horizontal solder surface to the board plane); the object is far enough away for it to be possible to assume the beam paths to be parallel, i.e. the object is located in the far field of the antenna arrangement. The path length r(m) for the antenna combination m=4·$m_{TX}$±$m_{RX}$ from the transmit antenna TX$m_{TX}$ to the object and back to the receive antenna RX$m_{RX}$ results in $$r(m)=2\cdot r_{RP}+\sin(-\alpha_{Az})\cdot(a+m_{TX}\cdot 4d+a+d/2+m_{RX}\cdot d)$$
$$=2\cdot r_{RP}+\sin(-\alpha_{Az})\cdot(2a+d/2+m\cdot d),$$

wherein $r_{RP}$ is the path length from a reference point RP on the antenna board to the object and a the horizontal distance between reference point and transmit antenna TX0. It is clear from this relationship that the distance changes in linear manner with the number m of the antenna combination. The quantity (2a+d/2+m·d) represents the horizontal distance of the "relative phase center" of the antenna combination m to the reference point RP and is the sum of the horizontal distance of the associated transmit and receive antenna to the reference point (the relative phase center of a combination of one transmit and one receive antenna is here defined as the sum of the two vectors from a reference point to the phase centers of the transmit and the receive antenna).

The phase difference φ(m)-φ(0) between the receive waves for the antenna combination m=0,1, . . . , 7 and the antenna combination m=0 results, in the basis of the different path lengths r(m), in $$\varphi(m) - \varphi(0) = -2\pi/\lambda \cdot [r(m) - r(0)]$$
$$= -2\pi/\lambda \cdot [2\cdot r_{RP} + \sin(-\alpha_{Az})\cdot(2a + d/2 + m\cdot d) -$$
$$2\cdot r_{RP} - \sin(-\alpha_{Az})\cdot(2a + d/2 + 0\cdot d)]$$
$$= -2\pi/\lambda \cdot \sin(-\alpha_{Az})\cdot d\cdot m = 2\pi/\lambda \cdot \sin(\alpha_{Az})\cdot d\cdot m$$

and thus likewise changes in linear manner with the number m of the antenna combination. The amplitude of the signals received on the different antenna combinations is constant, since all the antennas have the same emission characteristics and the distance of the antennas from the very distant object differs only negligibly from a level point of view.

Figure 7A:
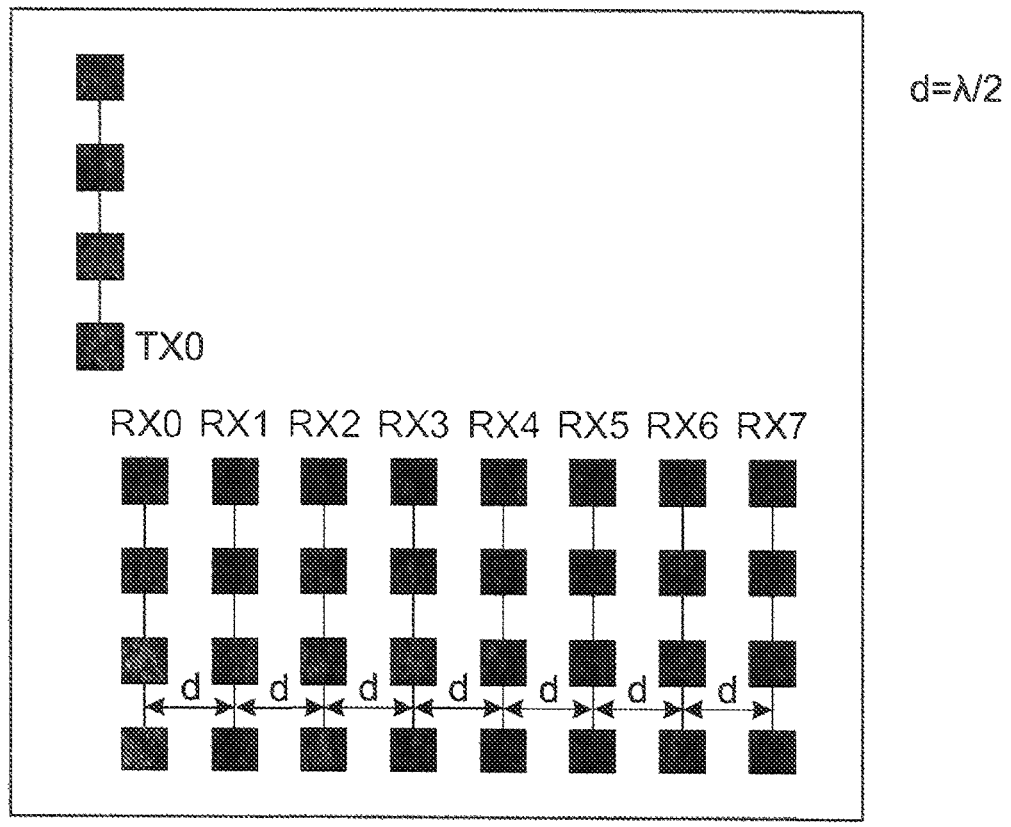
FIG. 7a shows an antenna arrangement with one transmit and 8 receive antennas, which is equivalent to the antenna arrangement considered according to FIG. 1 with two transmit and four receive antennas, according to one exemplary embodiment.
Figure 7B:
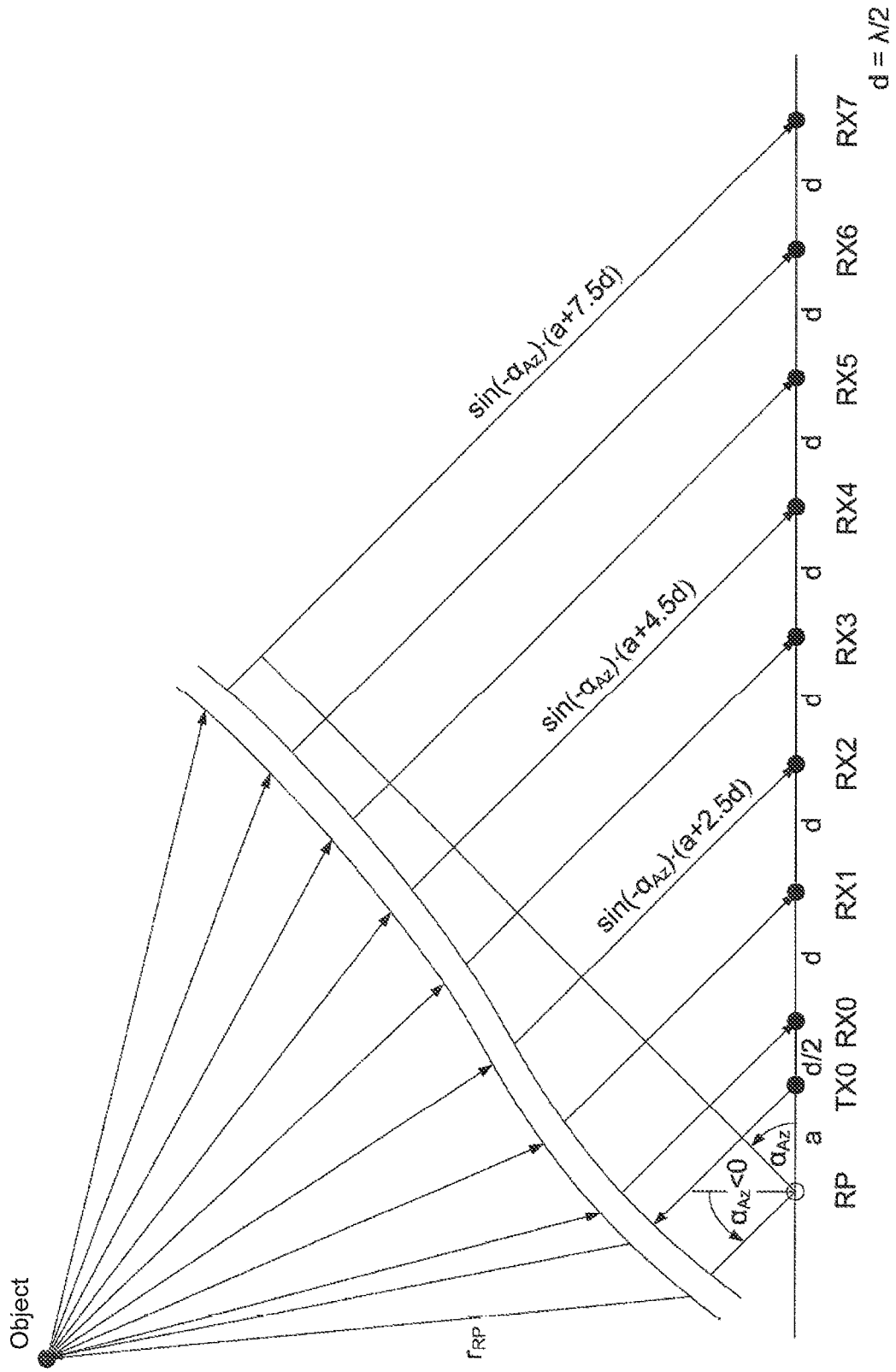
FIG. 7b shows the different path lengths between the individual antennas and a very remote object stationary relative to the sensor for this equivalent arrangement, according to one exemplary embodiment.

As is immediately apparent, in the case of the antenna arrangement depicted in FIG. 7a with vertical projection according to FIG. 7b, precisely the same relationships are obtained for the path length r(m) and the phase difference φ(m)-φ(0) as in the case of the previously considered arrangement according to FIG. 1; the arrangement according to FIG. 7a has only one transmit antenna TX0 and 8 equidistant receive antennas RX0-RX7, wherein the antenna combination m=$m_{RX}$ is now formed from the transmit antenna and the receive antenna RX$m_{RX}$. Owing to the identical individual antennas and identical phase relationships of the antenna combinations to one another, the two antenna arrangements are equivalent with regard to angular position measurability. The arrangement presented here according to FIG. 1, however, has the advantage that it has virtually only half the horizontal extent compared with the conventional arrangement according to FIG. 7a, so allowing a significant reduction in sensor size.

Figure 8A:
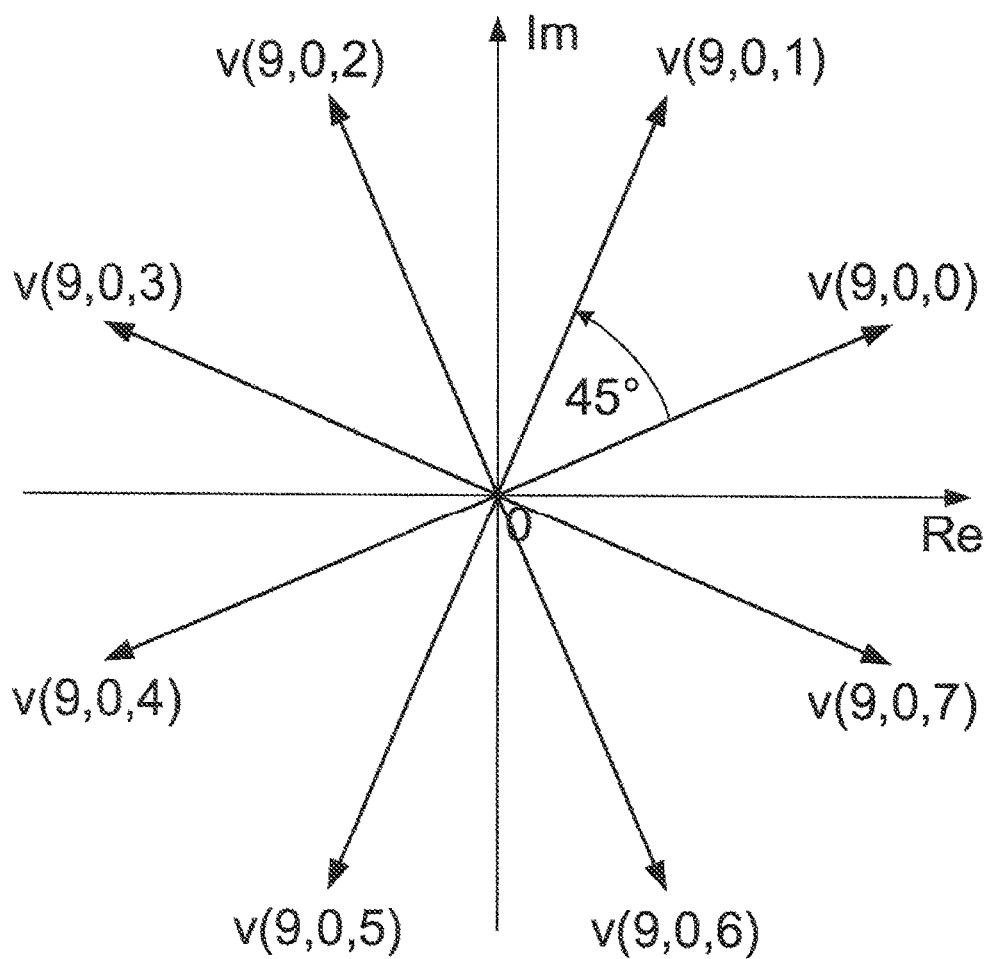
FIG. 8a shows for the above antenna arrangements the complex spectral value rotating over the antenna combinations in the range/relative velocity gate (9,0), in which exactly one object (stationary relative to the sensor) is present, according to one exemplary embodiment.
Figure 8B:
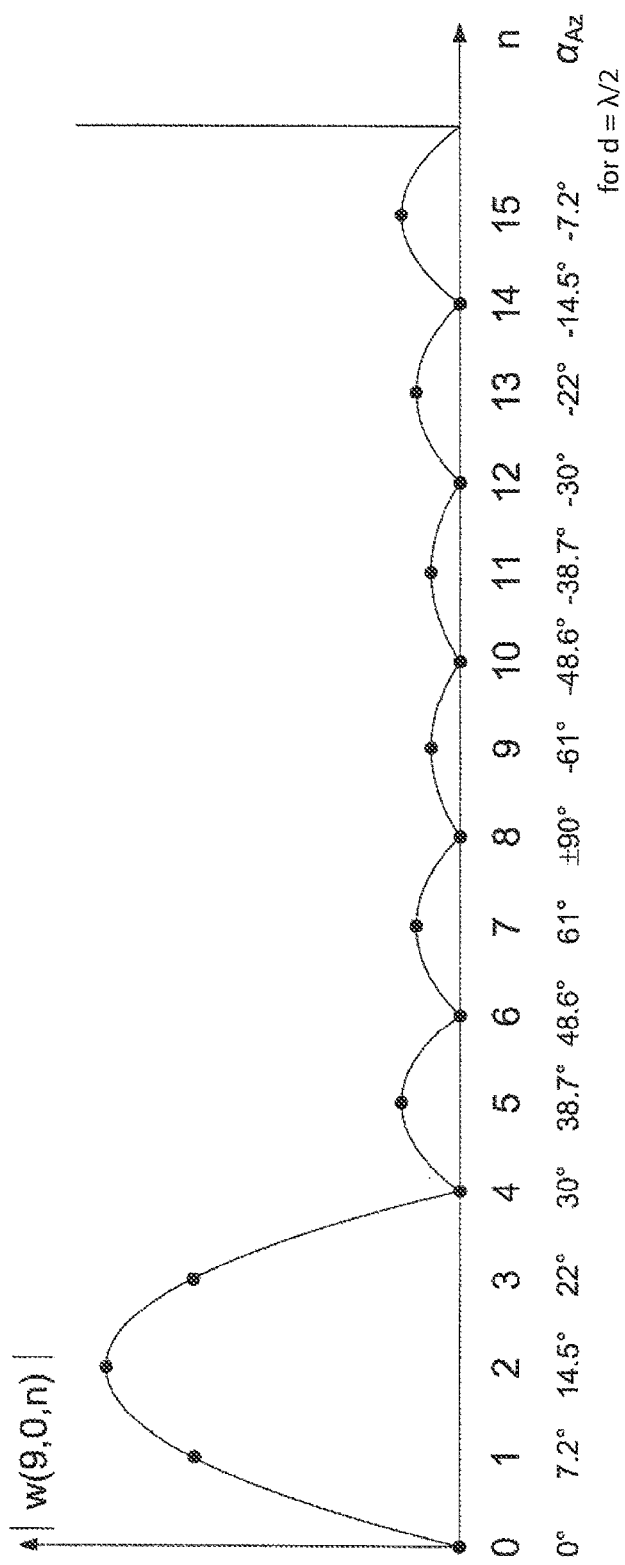
FIG. 8b shows the associated spectrum after the third DFT, in terms of magnitude, according to one exemplary embodiment.

The azimuth angle-dependent phase differences φ(m)-φ(0) increasing or reducing in linear manner over the 8 antenna combinations are maintained apart from possible constant and thus compensatable phase shifts (for example due to different line lengths) until after the second DFT; if there is therefore just one object in a range/relative velocity gate (j,l), the local complex spectral value v(j,l,m) rotates over the 8 antenna combinations m=0,1, . . . , 7 with a constant velocity of rotation dependent on the azimuth angle (see by way of example FIG. 8a). Digital beam shaping for the azimuth direction may therefore be performed in each range/relative velocity gate. To this end, sums are formed over the complex values relating to the 8 antenna combinations, which are each multiplied by a set of complex factors with a linearly changing phase; depending on the linear phase change of the respective factor set, radiation lobes result with different beam directions. The beam width of these radiation lobes is markedly less than that of the individual antennas. The above-described summation is achieved by a 16-point DFT, wherein the 8 values of the 8 antenna combinations are supplemented by 8 zeros. The discrete frequency values n=0,1, . . . , 15 of this DFT correspond to different phase differences Δφ=φ(m)·φ(m−1)= 2π·mods(n,16)/16 between adjacent antenna combinations (mods(n,16) here denotes the symmetrical modulo, i.e. imaging onto the domain −8 . . . +8) and thus to different azimuth angles $\alpha_{Az}$=arcsin(Δφ·λ/(2πd))=arcsin(mods(n·16)· λ(16d)) and may therefore be denoted angle gates. FIG. 8b depicts the profile w(j,l,n), in terms of magnitude, of the spectrum of the third DFT for the conditions according to FIG. 8a, which relate to a punctiform object at the azimuth angle $\alpha_{Az}$=14.5° (at the depicted phase difference between adjacent antenna combinations of 45°, which corresponds to π/4, n=2 and, for d=12, the azimuth angle $\alpha_{Az}$=arcsin(π/4)= 14.5°). The third DFT serves not only to determine the azimuth angle, but also increases detection sensitivity through integration thereof—in the case of 8 antenna combinations by about 10·$\log_{10}$(8)=9 dB.

For determination of the azimuth angle, it has hitherto been assumed that the object has the relative velocity zero. If this is not the case, the phase between the receive signals to the two transmit antennas activated with a time offset of in each case 40 μs also additionally changes proportionally to the relative velocity hereinafter assumed to be constant, since the range changes in each case slightly during this period. Since every third DFT belongs to a range/relative velocity gate and thus to a determined relative velocity, the linear phase change over the 8 antenna combinations generated by the relative velocity may be compensated either prior to or after the third DFT. In the event of compensation prior to the DFT, the phase of the complex input values has to be shifted, whereas in the event of compensation after the DFT, it is the discrete frequency values n belonging to the output values which have to be shifted. Due to the multiple values explained above for the relative velocity, this compensation leads to different azimuth angles depending on the hypothesis used for the multi-valued relative velocity.

Figure 9:
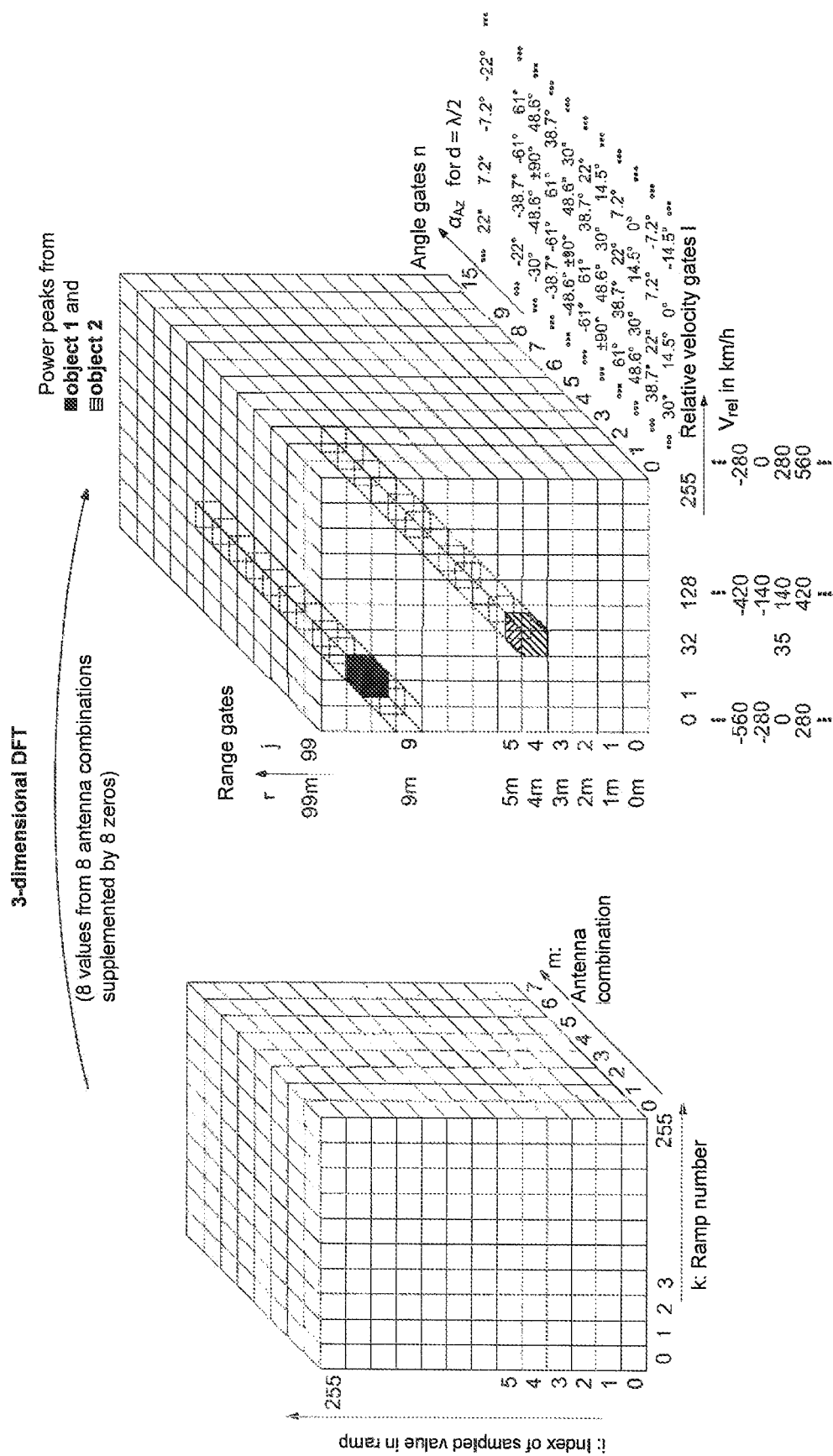
FIG. 9 is a schematic diagram of the data arrangement prior to the three-dimensional DFT (left) and the three-dimensional complex-valued spectrum w(j,l,n) thereafter (right), according to one exemplary embodiment.

After this third DFT for the azimuth angle (including compensation of the linear phase change over the antenna combinations generated by the relative velocity) a three-dimensional complex-valued spectrum w(j,l,n) arises, wherein the individual cells may be denoted range/relative velocity/angle gates and due to objects power peaks occur at the respectively associated range/relative velocity/angle gate (see FIG. 9; left: data arrangement prior to three-dimensional DFT, right: thereafter).

By determining the power peaks, objects may thus be detected and their measurements range, relative velocity (apart from possible multiple values, see above) and azimuth angle (one value corresponds to each multiple value hypothesis of relative velocity, see FIG. 9) established. Since power peaks determined by the DFT windowing also continue to have levels in neighboring cells, the object measurements may still be determined significantly more accurately by interpolation as a function of these levels than the gate widths. It should be noted that the window functions of the three DFTs are selected in such a way that on the one hand the power peaks do not become too wide (for satisfactory object separation), but on the other hand also the sidelobes of the window spectra do not become too high (so as also to be able to identify weakly reflective objects in the presence of highly reflective objects). From the height of the power peaks, the reflection cross-section thereof may be estimated as a fourth object measurement, which indicates how strongly the object reflects the radar waves. As a result of the noise present in every system (for example due to thermal noise), a certain power level results after the three-dimensional DFT even without received object reflections; this noise level, which varies to a given degree through random effects, constitutes the lower physical limit of detection capability. The detection threshold, above which objects are formed from power peaks, is placed at around 12 dB above average noise.

Hitherto, primary punctiform objects (i.e. extensive neither widthwise nor lengthwise) were observed with constant radial relative velocity and without lateral movement. The power peaks after the three-dimensional Fourier transform are then "sharp"; their shape corresponds to three-dimensional discrete Fourier transform of the window function shifted to the position of the three object variables velocity, range and angle, based respectively on one of the dimensions velocity, range and angle, the shape of the power peaks is the one-dimensional discrete Fourier transform of the respective window function shifted to the respective object variable. Objects for which the above conditions do not apply have "fuzzy" power peaks after the three-dimensional Fourier transform.

The described detection of objects and the determination of the associated object measurements constitute a measurement cycle and yield an instantaneous image of the environment; this is repeated cyclically around every 40 ms. To assess the environmental situation, the instantaneous images are tracked, filtered and evaluated over successive cycles; the reasons for this are in particular:
  some variables cannot be determined directly in a cycle, but rather only from the change over successive cycles (e.g. longitudinal acceleration and transverse velocity),
  the movement of objects may be plausibility checked over a plurality of cycles, resulting in a more robust and reliable description of the environment; for example, the change in (radial) range occurring over successive cycles has to match the measured (radial) relative velocity, which results in redundancy and thus additional reliability of the environment description,
  reduction of measurement noise by chronological filtering over a plurality of cycles.

The tracking and filtering of object detection over successive cycles is also known simply as tracking. In the process, values are predicted for the next cycle for each object from the tracked object measurements of the current cycle. These predictions are compared with the objects detected as a snapshot in the next cycle and the object measurements thereof in order to assign these correctly to one another. Then the predicted and measured object measurements belonging to the same object are merged, resulting in the current tracked object dimensions, which thus represent filtered values over successive cycles. If determined object measurements cannot be uniquely determined in one cycle, the various hypotheses must be taken into account during tracking. From the tracked objects and the associated tracked object measurements, the environment situation is analyzed and interpreted for the respective driver assistance function, so as to derive the corresponding actions therefrom.

It was explained above that, for punctiform objects with constant radial relative velocity and without lateral movement, after the three-dimensional Fourier transform "sharp" power peaks are obtained, the shape of which corresponds to the three-dimensional discrete Fourier transform of the window function shifted to the position of the three object variables velocity, range and angle, based in each case on one of the dimensions velocity, range and angle, the shape of the power peaks is here the one-dimensional discrete Fourier transform of the respective window function shifted to the respective object variable. This applies however only for an ideal circuit, in particular for ideal antennas and an ideal frequency modulation. In reality, a frequency modulation will never be perfect, for example due to physical noise effects such as thermal noise or through transient thermal or electrical phenomena or through finite accuracy in digital circuits and digital-analog transitions caused by quantization (for example by finite resolution of digital/analog converters for direct production of the oscillator control voltage or for settings for a phase-locked loop, i.e. a "PLL"). In addition to such inherent errors resulting from non-ideal circuits, markedly greater errors may also arise in frequency modulation due to failure or malfunction of individual circuit parts.

Hereinafter, only errors of frequency modulation are considered which are similar over the sequence of the transmit signals (i.e. the frequency ramps), i.e. deviations similar over all the frequency ramps of the actual profile of the transmission frequency within the transmit signals from the nominal profile.

Such an imperfect frequency modulation means that, even in the case of punctiform objects, the power peaks in range dimension are vague or fuzzy, which may lead to incorrect measurement of range, the concealment of smaller objects by larger objects and the production of ghost objects. This could lead the driver assist function implemented with the radar system to function incorrectly; in the case of an emergency braking assist system, for example, unjustified emergency braking could be activated by ghost objects, would could lead to a rear-end collision by a following vehicle with serious and possibly fatal consequences.

It is therefore important for the quality of the frequency modulation to be permanently monitored and either for errors which occur to be corrected or for the driver assistance function to be optionally disabled.

To effect monitoring of the frequency modulation, first of all the case is considered of reducing the frequency of the oscillator signal in the circuit block 1.11 of FIG. 1 by a factor of T=2048 by division and then digitizing it in the circuit block 1.12 by a real-valued analog/digital conversion with the sampling rate $f_A$=40 MHz.

After division by the factor T=2048, a signal arises whose frequency lies in the domain (24.15 GHz±187.5/2)/2048=11.8 MHz±45.8 kHz—at each frequency ramp the frequency of the divided-down signal changes in linear manner from the lower to the upper value, i.e. by 91.6 kHz, provided the oscillator frequency corresponds to its nominal profile according to FIG. 1 with a constant linear gradient and a constant frequency position (i.e. constant initial and thus center frequency); if the starting time of the frequency ramp is defined in each case as t=0, the following applies for the divided-down frequency during each of the K=256 frequency ramps (k=0,1, ..., K−1) of each of the 8 antenna combinations (m=0,1, ..., 7):

$$f_T(t,k,m)=f_{TM}+b_T \cdot (t-4 \text{ µs})=f_{TS}+b_T \cdot t \text{ for } 0 \leq t \leq 8 \text{ µs}$$

with $f_{TM}=11.8$ MHz, $f_{TS}=11.75$ MHz and $b_T=91.6$ kHz/8 µs.

Figure 10:
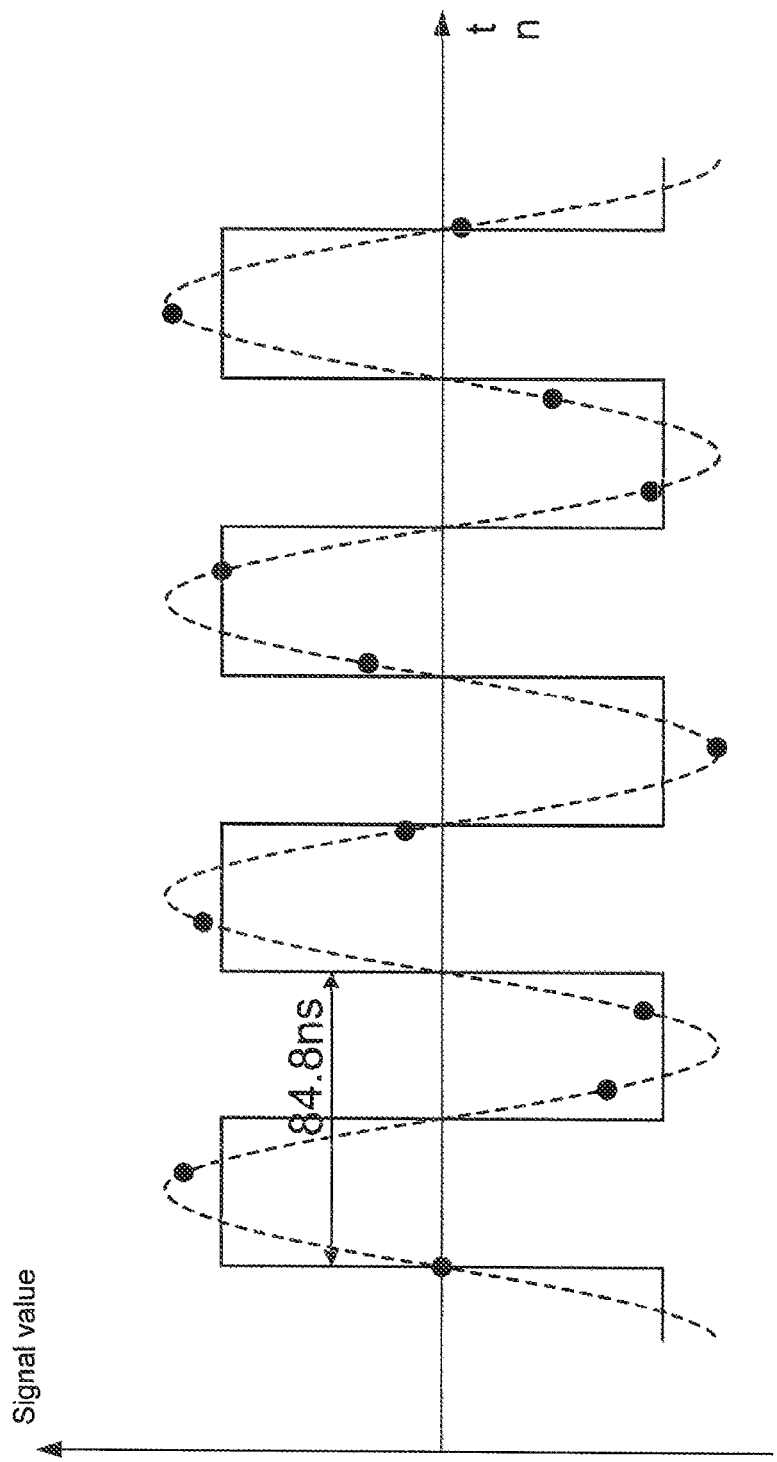
FIG. 10 shows a portion of the oscillator signal divided down by the factor T=2048 (continuous curve), the sinusoidal signal resulting therefrom after filtering (dashed curve) and the values thereof obtained after sampling (shown by dots), according to one exemplary embodiment.

Typically, the output signal of a divider has a rectangular profile; FIG. 10 depicts a portion (continuous curve). To achieve a sinusoidal profile, this signal is filtered with a low pass, which suppresses all the harmonics of the rectangular signal (the harmonics are located at uneven multiples of the respective fundamental frequency, i.e. around 3·11.8 MHz=35.4 MHz, 5·11.8 MHz=59 MHz, etc.); to this end, a typical anti-aliasing low pass may be used, the limit frequency of which lies at half the sampling frequency, i.e. 20 MHz. The sinusoidal signal which then arises is likewise depicted in FIG. 10 (dashed curve). The phase response $\varphi_T(t,k,m)$ of this sinusoidal signal $s_T(t,k,m)$ arises through integration of the divided-down frequency $f_T(t,k,m)$, such that the following applies:

$$s_T(t,k,m)=A_s \cdot \cos(Y_T(t,k,m))$$

with $\varphi_T(t,k,m)=2\pi \cdot [f_{TS} \cdot t + b_T/2 \cdot t^2] + \varphi_0(k,m)$, wherein $\varphi_0(k,m)$ represents the phase at the respective ramp start (i.e. at t=0) and in general varies from frequency ramp to frequency ramp; As is the amplitude of the signal.

After sampling of the sinusoidal signal $s_T(t,k,m)$ in the 25 ns grid (sampling rate $f_A=40$ MHz), the values likewise shown in FIG. 10 are obtained; for the sampled signal $s_{TA}(n,k,m)$ the following applies:

$$s_{TA}(n,k,m)=A_s \cdot \cos(2\pi \cdot [f_{TS}/f_A \cdot n \pm b_T/2/f_A^2 \cdot n^2] + \varphi_0(k,m)).$$

All these $K_0=2048$ signals (one per frequency ramp) are further processed in digitized form in the digital signal processing unit 1.10, in order to determine therefrom the quality of the frequency modulation, which is explained hereinafter.

The above relationship for the sampled, divided-down signal $s_{TA}(n,k,m)$ indicates the ideal case, in which namely the actual profile of the frequency corresponds to the linear nominal profile and no noise is superimposed on the signal. In actual fact, the frequency may however in particular include an error $f_E(t)$ which is systematic, i.e. the same for all frequency ramps (e.g. due to transient effects of a PLL or an error when generating the open- or closed-loop setpoint setting for frequency production). In the sampled, divided-down signal this leads to a phase error $\varphi_{TE}(n)$, which is interrelated as follows with the frequency error $f_E(n)$:

$$f_E(n)=T/(2\pi) \cdot [\varphi_{TE}(n)-\varphi_{TE}(n-1)] \cdot f_A.$$

In addition, the real signal $s_{TA}(n,k,m)$ also bears a noise component r(n,k,m), which arises for example due to phase noise from the oscillator and quantization effects in the case of A/D conversion. This then gives rise overall to the real signal $s_{TA}(n,k,m)$:

$$s_{TA}(n,k,m)=A_s \cdot \cos(2\pi \cdot [f_{TS}/f_A \cdot n + b_T/2/f_A^2 \cdot n^2] + \varphi_0(k,m) + \varphi_{TE}(n)) + r(n,k,m),$$

wherein $0 \leq n \cdot 8$ µs·$f_A$, i.e. $0 \leq n \leq 320$.

Although the noise component r(n,k,m) is much smaller than the useful component with the amplitude $A_s$, in general it is so great that it is not possible to determine the phase error $Y_{TE}(n)$ and thus the frequency error $f_E(n)$ sufficient accurately from the signal $s_{TA}(n,k,m)$ of a single frequency ramp. Averaging over multiple frequency ramps is therefore necessary, so that the noise component can be sufficiently well averaged out. If the signals $s_{TA}(n,k,m)$ were then simply directly averaged (i.e. the mean was formed for each sampling time n), the signals would also be averaged due to the varying start phase $\varphi_0(k,m)$, which is in general randomly distributed, i.e. largely mutually canceled out, such that no improvement would be achieved in frequency error estimation.

The averaging brings about a positive effect only when an at least partly in-phase accumulation of the signals $s_{TA}(n,k,m)$ is carried out for this purpose, i.e. the signals are previously firstly to be phase-normalized, i.e. shifted virtually to the same phase angle. For this purpose, the real-valued signals $s_{TA}(n,k,m)$ firstly have to be converted into their corresponding complex-valued signal, i.e. into their analytical signal $s_{TAC}(n,k,m)$:

$$s_{TAC}(n,k,m)=A_s \cdot \exp(j \cdot (2\pi \cdot [f_{TS}/f_A \cdot n + b_T/2/f_A^2 \cdot n^2] + \varphi_0(k,m) + \varphi_{TE}(n))) + r_C(n,k,m),$$

wherein $r_C(n,k,m)$ is the analytical signal of the noise r(n,k,m) and has a much smaller amplitude than the useful component of the signal with amplitude $A_s$; i denotes the imaginary unit. An analytical signal arises through complex-valued filtering with an "ideal Hilbert filter", which suppresses all negative frequencies and passes all positive frequencies with a constant transmission factor of 1. In real filters, it is not possible to achieve an infinitely narrow transition domain between blocking in the case of negative frequencies and passing of positive frequencies. This is however also not necessary in the case of the present signal $s_{TAC}(n,k,m)$, since it only has relevant spectral components in a narrow domain around $\pm f_{TM}=\pm 11.8$ MHz; therefore in a first step filtering with a complex-valued first level filter with a zero point at the frequency $-f_{TM}=-11.8$ MHz. After this Hilbert filtering, approximately the analytical signal $s_{TAC}(n,k,m)$ arises according to the above formula, wherein the complex-valued noise $r_C(n,k,m)$ also contains components at negative frequencies, which do not, however, interfere with further processing.

For phase normalization, each of the 2048 approximately analytical signals $s_{TAC}(n,k,m)$ is then in each case multiplied by the conjugate complexes of the first value thereof (at n=0); the result is then:

$$s_{TAN}(n, k, m) = \\ A_s \cdot \exp(\underline{i} \cdot (2\pi \cdot [f_{TS}/f_A \cdot n + b_T/2/f_A^2 \cdot n^2] + \varphi_{TE}(n) - \varphi_{TE}(0))) + \\ r_C(n, k, m) \cdot A_s \cdot \exp(-\underline{i} \cdot (\varphi_0(k, m) + \varphi_{TE}(0))) + \\ A_s \cdot \exp(\underline{i} \cdot (2\pi \cdot [f_{TS}/f_A \cdot n + b_T/2/f_A^2 \cdot n^2] + \varphi_0(k, m) + \varphi_{TE}(n))) \cdot \\ \operatorname{conj}(r_C(0, k, m)) + r_C(n, k, m) \cdot \operatorname{conj}(r_C(0, k, m)),$$

wherein conj(·) means the conjugate complex value. Since the amplitude of the noise $r_C(n,k,m)$ is much less than the signal amplitude $A_s$, the first component is dominant in this relationship, while the further components represent much less noise and hereinafter are combined into the noise signal $r_{CN}(n,k,m)$:

$$s_{TAN}(n,k,m)=A_s \cdot \exp(j \cdot (2\pi \cdot [f_{TS}/f_A \cdot n + b_T/2/f_A^2 \cdot n^2] + \varphi_{TE}(n) - \varphi_{TE}(0))) + r_{CN}(n,k,m).$$

The useful component of these signals, i.e. the first addend, is identical for each ramp due to the phase normalization. If these signals are therefore summed over all 2048 ramps (k=0,1, ..., K−1 and m=0,1, ..., 7), the useful component is increased in amplitude by a factor of 2048 and in power by a factor of $2048^2$, while for the noise which is random over the frequency ramps, i.e. uncorrelated, the power is only increased by a factor of 2048 (amplitude by a factor of 45); i.e. a signal-to-noise ratio is obtained which is better by $10 \cdot \log_{10}(2048) = 33$ dB than with the use of just one single frequency ramp.

After accumulation and division by the ramp number 2048, the following averaged signal arises $$s_{TAM}(n) = A_s \cdot \exp(\underline{i} \cdot (2\pi \cdot [f_{TS}/f_A \cdot n + b_T/2/f_A^2 \cdot n^2] + \varphi_{TE}(n) - \varphi_{TE}(0))) + r_{CM}(n)$$

$$= (A_s + a_r(n)) \cdot \exp(\underline{i} \cdot (2\pi \cdot [f_{TS}/f_A \cdot n + b_T/2/f_A^2 \cdot n^2] + \varphi_{TE}(n) - \varphi_{TE}(0) + \varphi_r(n))),$$

wherein the averaged noise $r_{CM}(n)$, which is on average smaller in power by a factor of 2048 than in the case of one frequency ramp, is represented in the second form of representation by way of the amplitude noise $a_r(n)$ and the phase noise $\varphi_r(n)$. From the phases of the complex values $s_{TAM}(n)$ established by measurement and processing and the known parameters $f_{TS}$, $b_T$ and $f_A$, it is now possible to determine the phase response $$\varphi_{TEmeas}(n) = \varphi_{TE}(n) - \varphi_{TE}(0) + \varphi_r(n).$$

If this phase error determined by measurement is used in the relationship indicated further above between phase error $\varphi_{TE}(n)$ and frequency error $f_E(n)$, the frequency error $f_{Emeas}(n)$ determined by measurement is obtained by way of evaluation of the relationship $$f_{Emeas}(n) = T/(2\pi) \cdot [(\varphi_{TEmeas}(n) - \varphi_{TEmeas}(n-1)] \cdot f_A;$$

the measured frequency error $f_{Emeas}(n)$ differs from the actual frequency error $f_E(n)$ only by the in general small measurement error $$f_{EmeasE}(n) = T/(2\pi) \cdot [\varphi_r(n) - \varphi_r(n-1)] \cdot f_A.$$

This measurement error can be reduced still further by extending averaging over multiple cycles. To this end, either the measured frequency error arising per cycle can be averaged, or the averaging of the phase-normalized signals is extended over multiple cycles.

It should be noted that phases can only be accurately determined down to integral multiples of $2\pi$, for which reason the determination of $f_{Emeas}(n)$ has to take place in modulo calculation with regard to $2\pi$ and the uniquely determinable domain of the frequency error amounts to "just" $T \cdot f_A$, which in the present example is over 80 GHz, however, and thus powers more than the possible errors.

Some more modifications to the above-described method will now be explained:

as is apparent from the above relationships, the phase noise $\varphi_r(n)$ (produced for example by quantization noise from the A/D converter) has an effect amplified by the division factor T on the measurement error, for which reason a high division factor is disadvantageous; when the oscillator signal is reduced by mixing this problem does not arise; however, production of a second signal in the 24 GHz domain is complex; a combination of dividing and mixing may therefore also be implemented; to this end, for example, the oscillator signal may firstly be divided by a factor of 64 to the domain of around 377 MHz and then mixed down with a fixed frequency of 367 MHz, for phase normalization, other values than the first value (n=0) used above may also be used, e.g. a value from the center of the frequency ramp, prior to evaluation of the averaged signal $s_{TAM}(n)$ Hilbert filtering may be carried out again, in order to produce a more accurate analytical useful signal and to reduce noise components at negative frequencies; it should be noted that a non-perfect analytical signal for phase normalization only has a slight influence (only low averaging losses), while it has greater effects for estimation of the $f_E(n)$, the Hilbert filtering coefficients may also be variably selected, i.e. adapted to the respective nominal frequency profile; for example, in a first level Hilbert filter the coefficients may be changed within a frequency ramp in such a way that the zero point always lies at the negative of the respective nominal frequency, it is assumed above that the frequency error $f_E(n)$ is identical over all 8 antenna combinations (m=0, 1, ..., 7); e.g. due to load dependency of the oscillator frequency the error could however also be different between the antenna combinations; then averaging and subsequent determination of the frequency error $f_E(n, m)$ is performed per antenna combination over the respective associated 256 frequency ramps.

Hereinafter, the further processing of a frequency error $f_E(n)$ determined as above is explained (it should be noted that no further distinction is drawn between a measured frequency error $f_{Emeas}(n)$ and an actual frequency error $f_E(n)$, since sufficiently accurate determination is assumed); the case is here considered that the frequency error is independent of the antenna combination m—the considerations may naturally be applied to the case of a frequency error dependent on the antenna combination. The frequency error $f_E(n)$ eliminates the systematic deviation of the actual frequency $f_{act}(n)$ from the nominal frequency $f_{nom}(n)$, i.e. a deviation which is the same for all frequency ramps, e.g. due to transient effects of a PLL:

$$f_{act}(n) = f_{nom}(n) + f_E(n) \text{ for } 0 \le n \le 320$$

with $f_{nom}(n) = f_M + b \cdot (n/f_A - 4 \text{ μs}) = f_S + b \cdot n/f_A$, and with $f_M = 24.15$ GHz, $f_S = 24.06$ MHz and $b = 187.5$ MHz/8 μs, wherein the time-discrete index n for the sampling rate $f_A = 40$ MHz extends from the beginning to the end of the frequency ramp of the duration 8 μs. Sampling of the receive signal is performed during the trailing 6.4 μs of the frequency ramp; the leading 1.6 μs are needed for transient effects (in particular through filters in frequency production and receive path) and for the propagation time corresponding to the range of maximum interest (0.66 μs at a range of maximum interest of 99 m). The first for example 20 values (i.e. the first 0.5 μs) are not utilized for assessing the frequency modulation, since there the transient effects of frequency production are still high and this frequency interval still effectively has no influence on the receive signals.

In the event of frequency errors $f_E(n)$ arising, the preferred approach is to compensate these frequency errors. One approach to this is to change the drive signal for generating the frequency modulation accordingly (in the case of direct production of the oscillator control voltage via a digital/analog converter, the drive values thereof or in the case of a PLL the signal for the setpoint setting), which may also proceed in iterative manner. Another approach consists in taking account of the frequency errors $f_E(n)$ when evaluating the receive signals. For example, the effect of an (average) gradient b, deviating from the setpoint setting, of the frequency ramps is a modified range gate length (see derivations above) and said gradient may be accordingly taken into account in range determination; a calculation of the real gradient of the frequency ramps may for example proceed by a linear regression over the actual frequency profile $f_{act}(n)$. A deviation of the center frequency of the frequency ramps from its nominal value changes the average wavelength and thereby has effects on the calculated relative velocity and angular position of objects (see derivations above); by using the real center frequency instead of the nominal center frequency it is possible to avoid errors.

If the frequency errors $f_E(n)$ cannot be compensated, it is necessary to assess whether the influence thereof on detection quality is still of an acceptable degree, i.e. no unacceptable functional restrictions arise; otherwise, the relevant driver assistance functions and/or autonomous driving maneuvers must be restricted or disabled.

Figure 11:
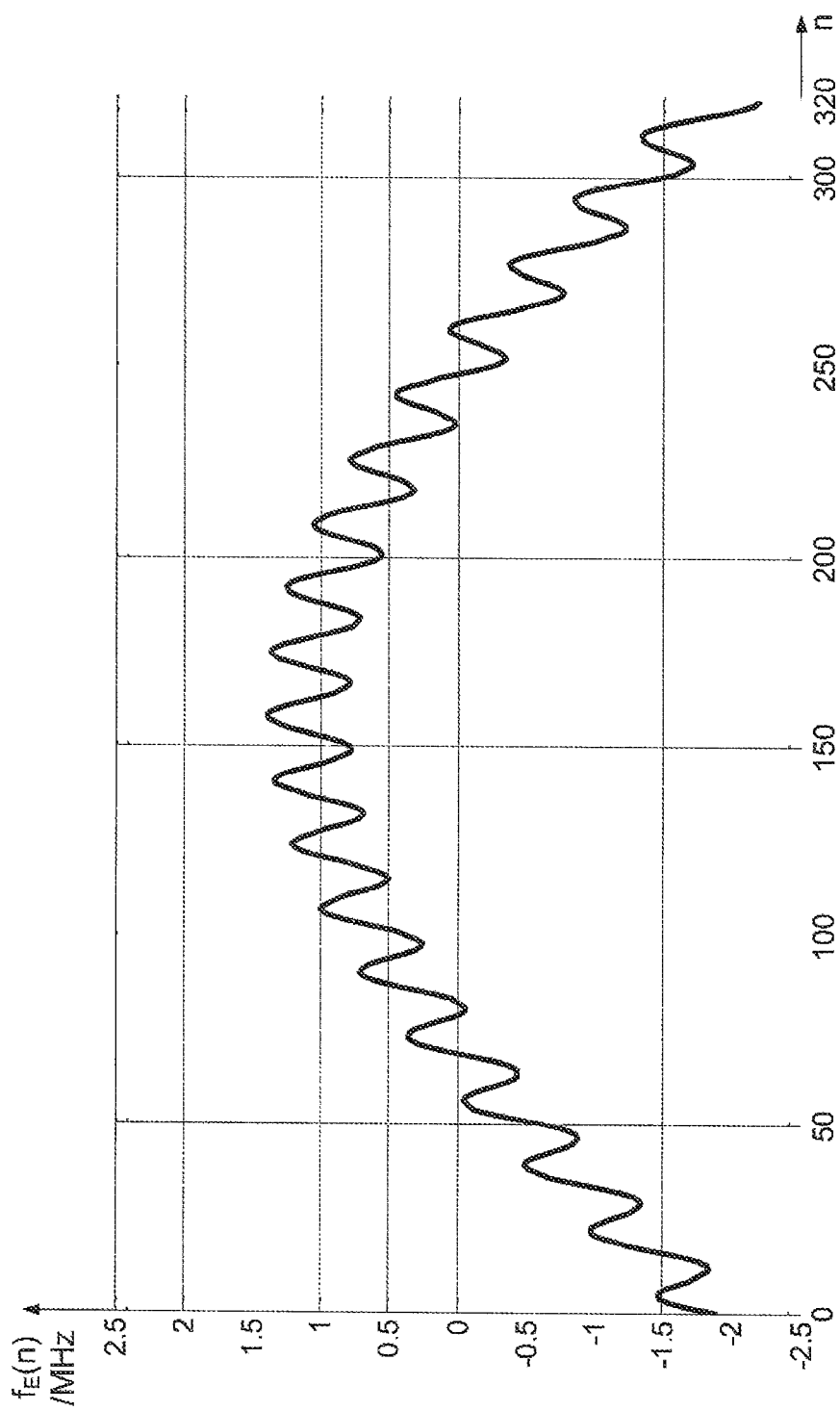
FIG. 11 shows the frequency error $f_E(n)$ for an actual frequency profile which is slightly curved relative to the nominal frequency profile and additionally has a periodic disturbance, wherein the center frequency and the average frequency gradient correspond to the nominal values thereof, according to one exemplary embodiment.

Deviations from a linear profile are particular critical; as an example thereof, an actual frequency profile is considered which is curved slightly relative to the nominal frequency profile and additionally has a periodic disturbance, wherein the center frequency and the average frequency gradient correspond to their nominal values—FIG. 11 depicts the corresponding frequency error $f_E(n)$. To assess such differences, the maximum value or the standard deviation could be determined for the linear regression. However, these values give only a rough indication of detection quality impairment.

Figure 12A:
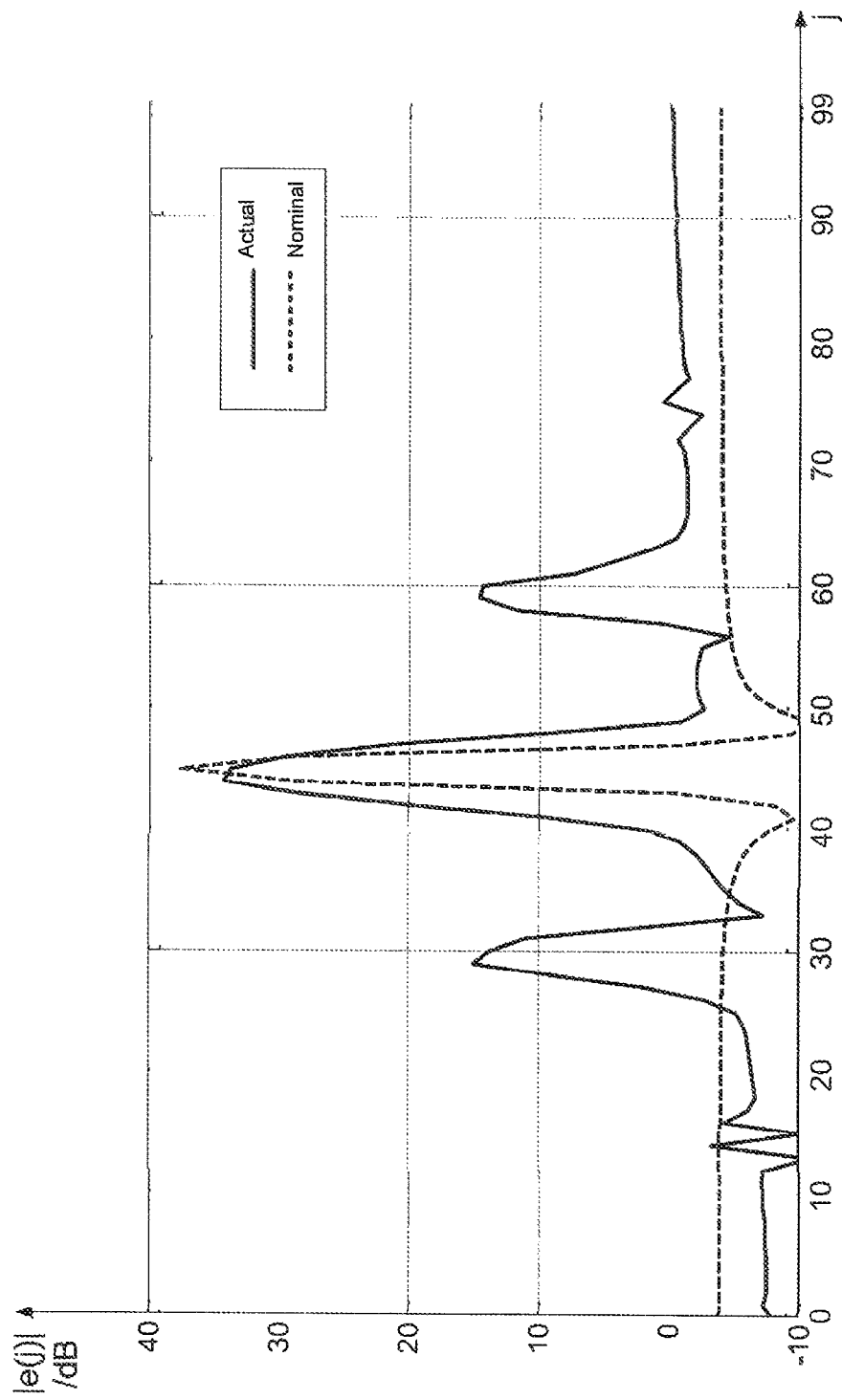
FIG. 12a shows, in a logarithmic representation (i.e. in dB) of the actual frequency position, the magnitude of the range spectrum e(j) (continuous line) and the magnitude of the range spectrum which results in the event of the nominal frequency profile for a target in the same range r=45 m, with the same amplitude 1 and using the same window function (dashed curve), according to one exemplary embodiment.

For a more precise assessment, more in-depth analyses have to be carried out. In a first approach, the range spectrum of a target arising in the case of actual frequency profile may be calculated for this purpose (i.e. the result of the first DFT over the sampled values of the receive signal of a frequency ramp); as an example a range of r=45 m is used here, with the associated propagation time being Δt=300 μs. The frequency of the receive signal is obtained as a difference between an undelayed actual frequency profile and an actual frequency profile delayed by the time Δt=300 ns and the phase of the receive signal by integration of this frequency difference; the following is therefore obtained for the real-valued receive signal (acquired in the trailing 6.4 μs of the frequency ramp and likewise with a sampling rate of $f_A$=40 MHz; should have an amplitude of 1):

$$s(i)=\sin(2\pi \cdot \text{sum}(f_{act}(n)-f_{act}(n-12),65,65+i)/f_A) \text{ for } 0 \le i \le 255,$$

wherein sum(g(n),u,o) means that the sequence g(n) is summed over u≤n≤o. The spectrum e(j) of this signal is obtained by a DFT; if a window function w(i) is used in the case of normal data evaluation for environment detection, the same window should be used here (i.e. the signal s(i) should be multiplied by w(i) prior to application of the DFT). For the frequency error $f_E(n)$ according to FIG. 11, FIG. 12a shows the resultant range spectrum e(j) in terms of magnitude (continuous line; logarithmic depiction, i.e. in dB), wherein the index j represents the range gates. For comparison, FIG. 12a also shows the range spectrum which results in the event of the nominal frequency profile for a target in the same range, with the same amplitude 1 and using the same window function (dashed curve). Through the curvature in the actual frequency profile, not only does a small shift arise but also a broadening of the power peaks belonging to the target around j=45, which may for example lead to smaller targets in the environment of a large one no longer being detectable (if they are at the same relative velocity and approximately the same angle, since they can otherwise be separated using these variables). The "rounding" of the power into a broader power peak also leads to a reduction in level, such that detection sensitivity decreases, which may result in smaller objects at a greater range no longer being generally detectable. Due to the periodic frequency disturbance, the additional, smaller power peaks are produced at j=29 and j=59; this is particularly critical since a real object may thereby generate closer ghost objects with the same relative velocity, which may for example lead to heavy emergency braking instead of moderate braking in response to a slower object (since a markedly closer slower ghost object is detected).

Figure 12B:
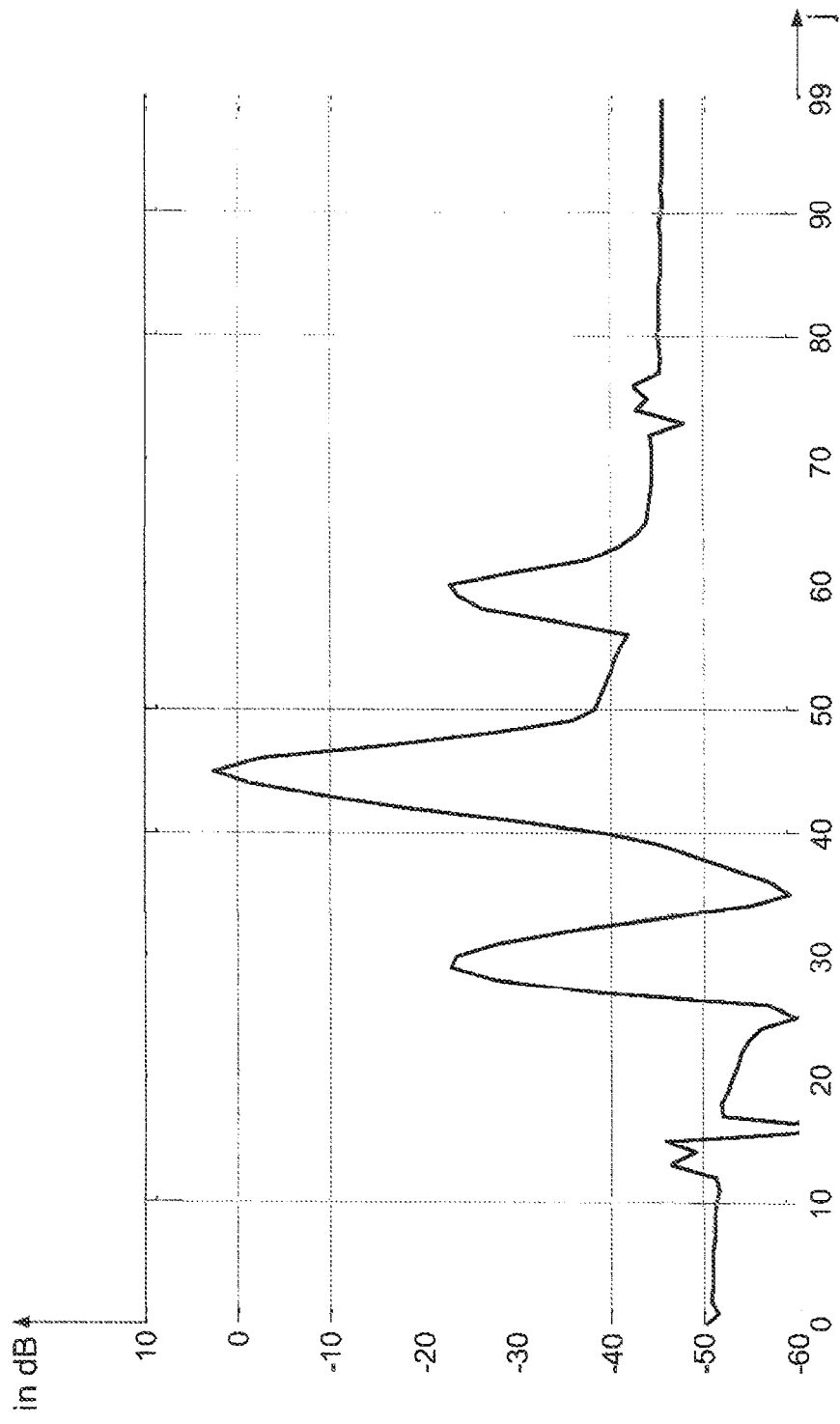
FIG. 12b shows the relative differential magnitude of these two range spectra, according to one exemplary embodiment.

To assess the quality of the frequency modulation, the range spectrum e(j) calculated for the actual frequency profile may for example be checked in terms of magnitude for a limit curve; alternatively, the magnitude of the difference between the range spectra relating to the actual and nominal frequency profiles may also be checked for a limit curve. FIG. 12b shows the magnitude of the difference in range spectra for the example above, wherein it is normalized to the maximum of the range spectrum for the nominal frequency profile and plotted in dB; through normalization to the maximum of the range spectrum for the nominal frequency profile, the difference may also be known as relative difference.

Checking for a limit curve constitutes a binary quality measure (i.e. with the two results good or bad); alternatively, an analog quality measure may also be defined, e.g. the maximum relative difference between the velocity spectra for the actual and nominal frequency profile.

The range spectrum considered above corresponds to a target at a specified range r=45 m; with another range a different profile would result for the relative difference shown in FIG. 12b between the range spectra for the actual and nominal frequency profiles, also apart from a position shifted by the changed range. In general, the relative difference between the range spectra for the actual and nominal frequency profiles may be described approximately with the assistance of the error function $$\begin{aligned}E(j) = {} & 20 \cdot \log_{10}\left[\left|2\pi \cdot \sin(\pi \cdot j/256 \cdot f_A \cdot \Delta t)/\right.\right.\\ & \left.\left.(\pi \cdot j/256 \cdot f_A) \cdot F_E(j)/W_S\right|\right] \\ = {} & 20 \cdot \log_{10}\left[\left|2\pi \cdot \Delta t \cdot \text{si}(\pi \cdot j/256 \cdot f_A \cdot \Delta t) \cdot \right.\right.\\ & \left.\left. F_E(j)/W_S\right|\right] \text{ for } 0 \le j \le 255,\end{aligned}$$

wherein $F_E(j)$ represents the DFT of the frequency error $f_E(n)$ over 65≤n≤320, the window function w again underlies this DFT of the length 256, Ws represents the sum over the 256 window values and the depiction is here indicated logarithmically (i.e. in dB). This error function is relative to the position, i.e. the range gate of the target; to establish the actual relative difference between the range spectra, it thus needs to be shifted cyclically by the range gate of the target. Furthermore, the error function also does not describe the small absolute reduction of the power peaks, which is caused by the loss of power into other range gates (i.e. in particular further, newly occurring power peaks).

This error function E(j) can be now be checked again for a limit curve or its maximum value may be determined as an absolute quality measure; in this respect, it is possible either to look only at an object range r, i.e. a propagation time Δt (for example the maximum) or to consider all propagation times Δt relevant to the driver assistance function. As a result of the factor Δt, the maximum propagation time tends to be the most critical, but, depending on the form of DFT $F_E(j)$, higher values for the error function E(jk) could still occur even in the case of lesser propagation times.

For an upper estimate, it is possible, for the purposes of simplification, to omit the factor $si(\pi \cdot j/256 \cdot f_A \cdot \Delta t)$, since this is at most 1 in terms of magnitude, and to consider only the maximum relevant propagation time $\Delta t$. This then effectively corresponds merely to a consideration of the magnitude of the DFT $F_E(j)$ of the frequency error $f_E(n)$ for assessment of the quality of the frequency modulation.

It should additionally be noted that the error function EU) is symmetrical relative to the center j=128, such that for evaluation thereof to assess the quality of the frequency modulation, only the values in the domain $0 \leq j \leq 128$ have to be considered.

In the example according to FIG. 11 and FIG. 12, a periodic frequency error results in additional smaller power peaks around the actual object, which may lead to ghost objects with the same relative velocity as the real object. If it is known from an analysis of the actual frequency profile how high such disturbance lines are or may be (e.g. through an upper estimate as explained above), then it may be checked for each detection whether it has or could have arisen through erroneous frequency modulation from another detection at the same relative velocity, and this detection may then be optionally wholly discarded or identified as a potential apparent detection.

In the case of the previous derivatives, the case was considered of all the transmit signals having the same nominal frequency profile. There are however also applications in which only the gradient of the frequency ramps is constantly predetermined, while the frequency position thereof, i.e. the initial and thus synonymously the center frequency thereof is deliberately varied over the transmit signals. This frequency shift of the transmit signals relative to one another means that the phases of the divided-down signals differ by a linear component, which may have a significant effect in the case of accumulation of the signals $s_{TAN}(n,k,m)$ over the 2048 transmit signals (for example even (partial) canceling out). This varying linear phase component therefore needs to be eliminated prior to accumulation of the approximately analytical signals $s_{TAN}(n,k,m)$, which may be achieved by multiplication by the rotating unit vector $\exp(-i \cdot 2\pi \cdot \Delta f(k,m)/T \cdot n/f_A)$, wherein $\Delta f(k,m)$ is the deviation of the respective center frequency for example from the average value of all center frequencies; this may also be interpreted to mean that all signals $s_{TAN}(n,k,m)$ are spectrally shifted to the same frequency position.

In the case of the considerations hitherto, the frequency modulation was monitored during the actual transmit signals (i.e. for the transmit signals whose associated receive signals are evaluated for environment detection). In order to save on the additional A/D converter for digitization of the divided-down oscillator signal, the A/D converter used for sampling of the receive signals could also be used for this purpose. Then monitoring of the frequency modulation could not, however, take place in parallel with environment detection; i.e. a further sequence of transmit signals with the same frequency profile would be introduced solely for monitoring the frequency modulation—monitoring of the frequency modulation and environment detection would then take place at different frequency ramps, which are arranged either in two sequentially successive blocks or by nesting in one another. For the ramps used for monitoring frequency modulation, the transmission power could also be switched off (to save power and provided this does not have any influence on the frequency modulation error).

The case has hitherto been observed of an A/D converter being used for digitization of the frequency-reduced oscillator signal; now a counter will be used instead in the circuit block 1.12 of FIG. 1. In this case, the oscillator signal is divided down in the circuit block 1.11 merely by the factor T=4, such that the center frequency is $f_T$=6.04 GHz. The value of the counter is incremented by 1 at each positive edge of the divided-down rectangular signal; the counter thus counts the number of periods of the divided-down signal. The counter is not reinitialized at the start of each frequency ramp but rather simply keeps on counting, even between the frequency ramps—it may thus be described as a free-running counter which manages without intermediate initialization.

Figure 13:
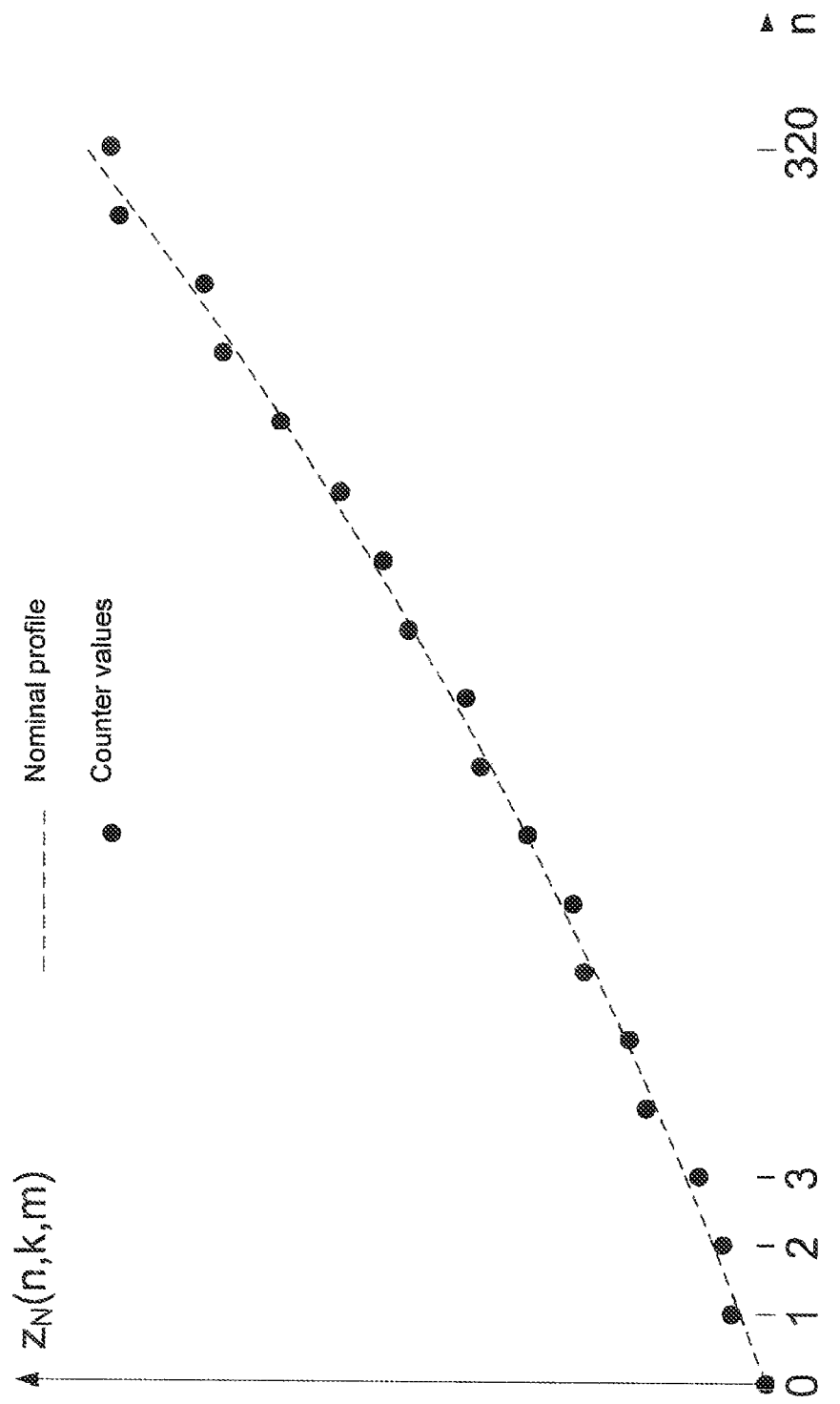
FIG. 13 shows the values over a transmit signal of the frequency counter read out every 25 ns and normalized at the ramp start (plotted points); the expected nominal profile is shown by a dashed line, according to one exemplary embodiment.

During each of the K=256 frequency ramps (k=0,1, ..., K-1) lasting 8 μs of each of the 8 antenna combinations (m=0,1, ..., 7), the counter is read out every 25 ns (i.e. with the same clock rate as sampling of the receive signals); the read-out times are designated by the index n=0,1, ..., 320, the read-out counter values with z(n,k,m). From an absolute standpoint, the counter values are very different from frequency ramp to frequency ramp, since they increase ever more due to the continuous incrementation. For normalization purposes, they are in each case related to their first value z(0,k,m), i.e. this value is in each case subtracted:

$$z_N(n,k,m)=z(n,k,m)-z(0,k,m) \text{ for } n=0,1,\ldots,320;$$

an approximately identical profile is thus obtained in each frequency ramp; it should be noted that normalization could also be carried out to another value, e.g. in the center of the frequency ramp. FIG. 13 shows the profile of the normalized counter value $z_N(n,k,m)$ for a frequency ramp k and an antenna combination m. A dashed line shows the expected nominal profile, which represents a parabolic segment (normalized counter value is proportional to the signal phase, which arises through integration, beginning at the ramp start, over the linear signal frequency and thus has a square component); it should be noted that the curvature of the nominal profile is depicted exaggeratedly in the figure. The dots in FIG. 13 represent the measured normalized counter values $z_N(n,k,m)$.

The deviation (depicted exaggeratedly in FIG. 13) from the nominal profile arises above all in that the counter is rounded virtually to a whole number of periods, it counting only the positive edges of the divided-down rectangular signal. If there are therefore for example 1210.5 periods of the divided-down signal between the ramp start and a read-out time n, then the normalized counter value will have the value of either 1210 or 1211, depending on whether there is more or less than a half-period between the ramp start and the next positive edge. The error thus amounts to plus or minus half a period, with a probability of in each case 50%; the standard deviation is then also a half-period. If there are only 1210.25 periods between the start time of the counter and a read-out time n, then 1210 periods are measured with a probability of 75% and 1211 periods with a probability of 25%; the standard deviation then amounts to 0.43 periods. If the start time and read-out time are located precisely 1210 periods apart, the correct value is always measured and the standard deviation is 0. The measurement error thus extends to at most plus or minus one period; over different signal frequencies, the distribution is triangular with the maximum at error 0, such that the standard deviation is the 1/√6th part of a period.

First of all, frequency estimation on the basis of a frequency ramp will now be explained (even if this is subsequently not the procedure used). From the normalized counter value $z_N(n,k,m)$, it is possible to estimate the average frequency of the divided-down signal between the ramp start and the respective point in time under consideration (n·25 ns after ramp start) by dividing the normalized counter value by the associated time interval n·25 ns; the frequency of the oscillator and thus the transmission frequency is higher by a factor of T=4 (i.e. the division factor). The error of at most plus or minus one period then corresponds to a frequency error of ±1/(n·25 ns) relative to the divided-down signal and thus a frequency error of ±4/(n·25 ns) relative to the transmit signal. These interrelationships also apply mutatis mutandis if the average frequency between two different points in time is determined by the difference in the normalized counter values between these two points in time (at the indices $n_1$ and $n_2$); the maximum frequency error relative to the transmit signal then amounts to $\pm 4/((n_2-n_1)\cdot 25$ ns). For two points in time, which are spaced for example by 250 ns, a maximum error of 16 MHz is arrived at and the standard deviation amounts to 16 MHz/√6=6.5 MHz—the standard deviation takes into consideration the fact that, to identify the frequency modulation, a sequence of time intervals over the frequency ramp is considered and different frequencies and thus different error distributions correspond to the different time intervals.

For an analysis of frequency modulation, i.e. of the frequency profile within the transmit signals, this error is too great, since even markedly smaller differences between the actual profile and the nominal profile could lead to unacceptable errors in environment detection and would thus remain undiscovered.

By averaging over all 2048 frequency ramps, a frequency modulation error which is systematic, i.e. similar for all the ramps, may be determined significantly more accurately. To this end, the normalized counter value $z_N(n,k,m)$ is accumulated for every n over all 2048 frequency ramps, the accumulated normalized counter values $Z_N(n)$ thereby being obtained. The average frequency between two points in time at the indices $n_1$ and $n_2$, averaged over all frequency ramps, results in $(Z_N(n_2)-Z_N(n_1))/((n_2-n_1)\cdot 25$ ns)·4/2048. Since the phase of the divided-down signal present at the ramp start varies in general over the frequency ramps, the above-described error of the counter values $z_N(n,k,m)$ also varies due to only whole periods being counted. In the case of approximately random variation of the ramp start phases, the error will, with the above-explained probabilities, assume the two respective values and, on averaging, will become statistically ever smaller as the frequency ramp number increases (the quantization errors of the counter virtually average one another out to an ever greater extent). In this way, the standard deviation of the error becomes smaller by a factor of 42048=45; for two points in time, which are spaced for example by 250 ns, a standard deviation of 144 kHz is then obtained.

Given even this measuring accuracy, the linearity of the frequency modulation can very readily be verified. By averaging the frequency profile or frequency error determined in this way, still higher accuracy may be achieved over multiple radar cycles.

So that measuring accuracy increases over the use of many frequency ramps, the phases of the divided-down signal (and thus of the oscillator signal) have, as explained above, to vary from ramp to ramp at the ramp start. If phase noise or other effects are inadequate therefor, this may be forced for example by varying one or more parameters of the oscillator frequency between the actual transmit signals; for example by varying the point in time of the frequency return jump (i.e. the ramp end is varied slightly).

It should also be mentioned that real counters are limited in length, i.e. in their maximum counter reading and overrun may thereby occur—they thus reach the maximum counter reading and then jump back to 0 with the next edge to be counted. This corresponds to a modulo calculation; if the evaluations of the counter are also performed in modulo calculation, the result is not distorted by overrunning provided the number of periods to be counted between the two points in time $n_1$ and $n_2$ considered does not exceed the counter length (i.e. the maximum counter reading.

As is apparent from the above derivatives, the accuracy of the measurement decreases as the division ratio T increases. On the other hand, the counter has to be faster, the less the frequency is divided down—a rapid counter is however complex to implement in a circuit and requires a lot of power. Frequency mixing may circumvent this problem, since it does not have any effect on measuring accuracy; however, the production of a second signal in the 24 GHz domain is costly. A combination of dividing and mixing may therefore also be implemented. To this end, the oscillator signal may for example initially be divided by a factor of 4 to the domain of around 6.04 GHz and then mixed-down with a fixed frequency of 5.8 GHz, such that the counter has only to continue to operate in the domain of around 200 MHz.

A further approach to reducing the division factor T is a counter which counts both the positive and the negative edges of the divided-down signal.

Finally, the advantages and disadvantages of the two above-described methods for digitizing the frequency-reduced oscillator signal should also briefly be discussed. Compared with the counter approach, A/D conversion has the advantage of being capable of operating with relatively large frequency division factors, since it is in principle capable of measuring frequencies or phases more accurately (at identical input signal frequencies). An A/D converter is however generally more costly to implement for this purpose than a counter (at identical input signal frequencies), and evaluation of the A/D converter values is more complex than that of the counter values.

It should be noted that the considerations and embodiments described with reference to the above examples may be applied to general dimensions and parameter designs, i.e. they may also be applied to other numerical values. For example, the approaches according to the invention may accordingly also be applied to a radar in the 77 GHz domain.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

The invention claimed is:

1. A method of controlling a radar system of a motor vehicle, the method comprising:
generating a sequence of $K_0$ ($K_0>1$) transmission-frequency-modulated transmit signals, each transmission-frequency-modulated transmit signal among the $K_0$ transmission-frequency-modulated transmit signals having a same nominal frequency profile, apart from a variation in frequency position,
emitting the $K_0$ transmission-frequency-modulated transmit signals utilizing a transmit antenna of the radar system;
receiving reflected transmit signals among the $K_0$ transmission-frequency-modulated transmit signals reflected from objects utilizing a receiving antenna of the radar system;

averaging over the $K_0$ transmission-frequency-modulated transmit signals;

performing phase normalization on average values of the $K_0$ transmission-frequency-modulated transmit signals to generate an averaged signal;

determining a phase response of the averaged signal;

determining a frequency error of the averaged signal based on the phase response of the averaged signal; and correcting oscillation of an oscillator generating the $K_0$ transmission-frequency-modulated transmit signals based on the frequency error.

2. The method according to claim 1, further comprising varying a frequency position and/or a parameter of a frequency profile of the oscillator between the $K_0$ transmission-frequency-modulated transmit signals to ensure over the $K_0$ transmission-frequency-modulated transmit signals a varying phase angle of the oscillator at the start of each transmission-frequency-modulated transmit signal among the $K_0$ transmission-frequency-modulated transmit signals.

3. The method according to claim 1, wherein the averaging comprises:

reducing a frequency of a signal used for analysis relative to the $K_0$ transmission-frequency-modulated transmit signal by frequency division by a factor of T>1 and/or by mixing;

sampling low-frequency signals arising from the $K_0$ transmission-frequency-modulated transmit signals after filtering;

performing phase normalization on the $K_0$ transmission-frequency-modulated transmit signals after further filtering;

summing the phase-normalized $K_0$ transmission-frequency-modulated transmit signals; and determining an actual frequency profile from a phase profile of the summed $K_0$ transmission-frequency-modulated transmit signals.

4. The method according to claim 3, wherein the phase normalization on the $K_0$ transmission-frequency-modulated transmit signals comprises:

in the event of the low-frequency sampled $K_0$ transmission-frequency-modulated transmit signals being real-valued, the low-frequency sampled real-valued $K_0$ transmission-frequency-modulated transmit signals are in each case at least approximately converted into an analytical signal thereof, wherein a first level Hilbert filter with the zero point at approximately the negative or positive of a center frequency of the $K_0$ transmission-frequency-modulated transmit signals is utilized, a value is in each case determined from the analytical signals utilizing the conjugate complexes of a first signal value or of a signal value at a point in time when the nominal frequency profile assumes the average frequency, and the analytical signals are multiplied by the determined value.

5. The method according to claim 3, in which the summer $K_0$ transmission-frequency-modulated transmit or a signal derived therefrom is converted by Hilbert filtering into the analytical signal.

6. The method according to claim 5, wherein the frequency of the emitted $K_0$ transmission-frequency-modulated transmit signals is linearly modulated, the reflected transmit signals are transferred into a low-frequency domain by mixing with a signal whose frequency corresponds to an instantaneous transmission frequency or differs therefrom by a constant factor, the low-frequency receive signals are sampled $N_A$ times in an equidistant grid, and wherein the method further comprises forming a first spectral analysis is formed by way of the $N_A$ sampled values, a form of a discrete Fourier transform.

7. The method according to claim 6, wherein a difference between an undelayed actual frequency profile and a measured actual frequency profile delayed by a time $\Delta t$ is formed within the $K_0$ transmission-frequency-modulated transmit signals, and wherein the method further comprises:

calculating a signal, a frequency profile of which corresponds to the difference, performing a spectral analysis in a form of a discrete Fourier transform via the signal, which spectral analysis results in a spectrum, and driving a quality measure of the frequency modulation based on the spectrum or from a deviation of the spectrum from a spectrum expected in a case of a nominal frequency profile, of an object at the range r corresponding to the propagation time $\Delta t$, wherein a same window function is used for the spectral analysis.

8. The method according to claim 5, further comprising performing a spectral analysis in a form of a discrete Fourier transform by way of a difference between an actual and a nominal frequency profile, wherein a resultant spectrum or a magnitude thereof is used directly or after multiplication by a factor as a quality measure of the frequency modulation, wherein the factor is proportional to an assumed object range or may include a sine function, an argument of which is proportional to the object range and proportional to a respective frequency interpolation point of the spectral analysis.

9. The method according to claim 8, further comprising determining from an established quality measure whether detection has or could have taken place by deviation of the actual frequency profile from the nominal frequency profile from another detected object, and this detection is then optionally wholly discarded or identified as potential apparent detection.

10. The method according to claim 6, further comprising determining an average frequency gradient of the actual frequency profile or the deviation thereof from the nominal frequency gradient and calculating a range of objects.

11. The method according to claim 6, further comprising determining the center frequency of the actual frequency profile or the deviation thereof from the nominal center frequency and calculating a relative velocity and/or an angular position of objects.

* * * * *